United States Patent
Honea et al.

(10) Patent No.: US 9,214,781 B2
(45) Date of Patent: Dec. 15, 2015

(54) FIBER AMPLIFIER SYSTEM FOR SUPPRESSION OF MODAL INSTABILITIES AND METHOD

(71) Applicant: Lockheed Martin Corporation, Bethesda, MD (US)

(72) Inventors: Eric C. Honea, Seattle, WA (US); Matthias P. Savage-Leuchs, Woodinville, WA (US); Sean M. Courtney, Jamaica Plain, MA (US); Khushvinder S. Brar, Bothell, WA (US); Jason D. Henrie, Snohomish, WA (US); Christian D. Dilley, Everett, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 3 days.

(21) Appl. No.: 14/086,744

(22) Filed: Nov. 21, 2013

(65) Prior Publication Data

US 2015/0138630 A1 May 21, 2015

(51) Int. Cl.
*H01S 3/067* (2006.01)
*G02B 6/02* (2006.01)
(Continued)

(52) U.S. Cl.
CPC ............ *H01S 3/042* (2013.01); *H01S 3/06758* (2013.01); *H01S 3/094007* (2013.01); *H01S 3/06704* (2013.01); *H01S 3/06712* (2013.01); *H01S 3/06733* (2013.01);
(Continued)

(58) Field of Classification Search
CPC .... G02B 6/02009; G02B 6/024; G02B 6/036; H01S 3/06758
See application file for complete search history.

(56) References Cited

U.S. PATENT DOCUMENTS

| 4,829,529 A | 5/1989 | Kafka |
| 5,074,633 A | 12/1991 | Cohen et al. |

(Continued)

FOREIGN PATENT DOCUMENTS

WO    WO03098295    11/2003

OTHER PUBLICATIONS

Ward et al., "Origin of thermal modal instabilities in large mode area fiber amplifiers", Optics Express vol. 20, Issue 10, pp. 11407-11422, (2012).*

(Continued)

*Primary Examiner* — Eric Bolda
(74) *Attorney, Agent, or Firm* — Charles A. Lemaire; Jonathan M. Rixen; Lemaire Patent Law Firm, P.L.L.C.

(57) ABSTRACT

Apparatus and method for suppressing modal instabilities (MI) in fiber-amplifier systems. In some embodiments, thermal effects drive the MI process, and in some such embodiments, the present invention provides a plurality of options for mitigating these thermal effects. In some embodiments, the present invention provides a hybrid fiber with a smaller core in the initial length where the thermal loads are highest, followed by a larger-core fiber. In some embodiments the length of the smaller-core section is chosen to keep the core heat-per-unit-length of the second section below a critical value for the onset of MI. In some embodiments, the hybrid fiber of the present invention avoids modal instabilities while yielding almost the same performance as compared to conventional fibers with regard to minimizing fiber nonlinearities such as Stimulated Brillouin Scattering (SBS). In some embodiments, the hybrid fiber outputs a signal beam with at least 1 kW of power.

20 Claims, 26 Drawing Sheets

(51) Int. Cl.
*G02B 6/024* (2006.01)
*H01S 3/042* (2006.01)
*H01S 3/094* (2006.01)
*H01S 3/0941* (2006.01)
*H01S 3/16* (2006.01)

(52) U.S. Cl.
CPC ........ *H01S 3/06745* (2013.01); *H01S 3/09415* (2013.01); *H01S 3/1618* (2013.01); *H01S 2301/02* (2013.01); *H01S 2301/03* (2013.01)

(56) References Cited

U.S. PATENT DOCUMENTS

| | | | |
|---|---|---|---|
| 5,508,842 A | 4/1996 | Takeda et al. | |
| 5,708,669 A | 1/1998 | DiGiovanni et al. | |
| 5,778,129 A | 7/1998 | Shukunami et al. | |
| 5,864,644 A | 1/1999 | DiGiovanni et al. | |
| 5,930,030 A | 7/1999 | Scifres | |
| 6,289,027 B1 | 9/2001 | Lawrence et al. | |
| 6,324,326 B1 | 11/2001 | Dejneka et al. | |
| 6,362,916 B2 | 3/2002 | Wu et al. | |
| 6,731,837 B2 | 5/2004 | Goldberg et al. | |
| 6,836,607 B2 | 12/2004 | Dejneka et al. | |
| 6,970,624 B2 | 11/2005 | DiGiovanni et al. | |
| 7,557,986 B2 * | 7/2009 | Sintov | 359/341.1 |
| 7,768,700 B1 * | 8/2010 | Savage-Leuchs | 359/341.1 |
| 7,809,236 B2 | 10/2010 | Muendel | |
| 8,089,689 B1 * | 1/2012 | Savage-Leuchs | 359/341.1 |
| 2003/0103724 A1 | 6/2003 | Duck et al. | |
| 2007/0104431 A1 * | 5/2007 | Di Teodoro et al. | 385/123 |
| 2009/0103874 A1 * | 4/2009 | Broeng et al. | 385/126 |
| 2012/0127563 A1 | 5/2012 | Farmer et al. | |
| 2012/0287951 A1 * | 11/2012 | Beach et al. | 372/6 |
| 2013/0322470 A1 * | 12/2013 | Creeden et al. | 372/6 |

OTHER PUBLICATIONS

2011 SSDLTR Technical Digest TOC, "2011 Solid State Diode Laser Technology Review", "2011 SSDLTR Technical Digest TOC", 2011, pp. 1-5.
John Edgecumbe, et al., "Single Mode, High Power, Narrow Linewidth Fiber Amplifiers", "SSDLTR Fiber Lasers", Jun. 7, 2011.
Hansryd, Jonas, et al., "Fiber-Based Optical Parametric Amplifiers and their Applications", 2002, pp. 506-517, vol. 8, No. 3.
C. Jauregui, et al., "The Impact of Modal Interference on the Beam Quality of High-power Amplifiers", "Optics Express", , pp. 3258-3271, vol. 19, No. 4, Feb. 14, 2011.
Teemu Kokki, et al., "Fiber Amplifier Utilizing an Yb-doped Large-mode-area Fiber With Confined Doping and Tailored Refractive Index Profile", "Proc. SPIE7580, Fiber Lasers VII: Technology, Systems, and Applications", Feb. 17, 2010.
Okhotnikov, O.G., et al., "Flared single-transverse-mode fibre amplifier", "Electronics Letters", Jun. 10, 1999, pp. 1011-1013, vol. 35, No. 12.
Smith, Arlee V., et al., "Mode Instability in High Power Fiber Amplifiers", "Optics Express", May 23, 2011, pp. 10180-10192, vol. 19, No. 11.

* cited by examiner

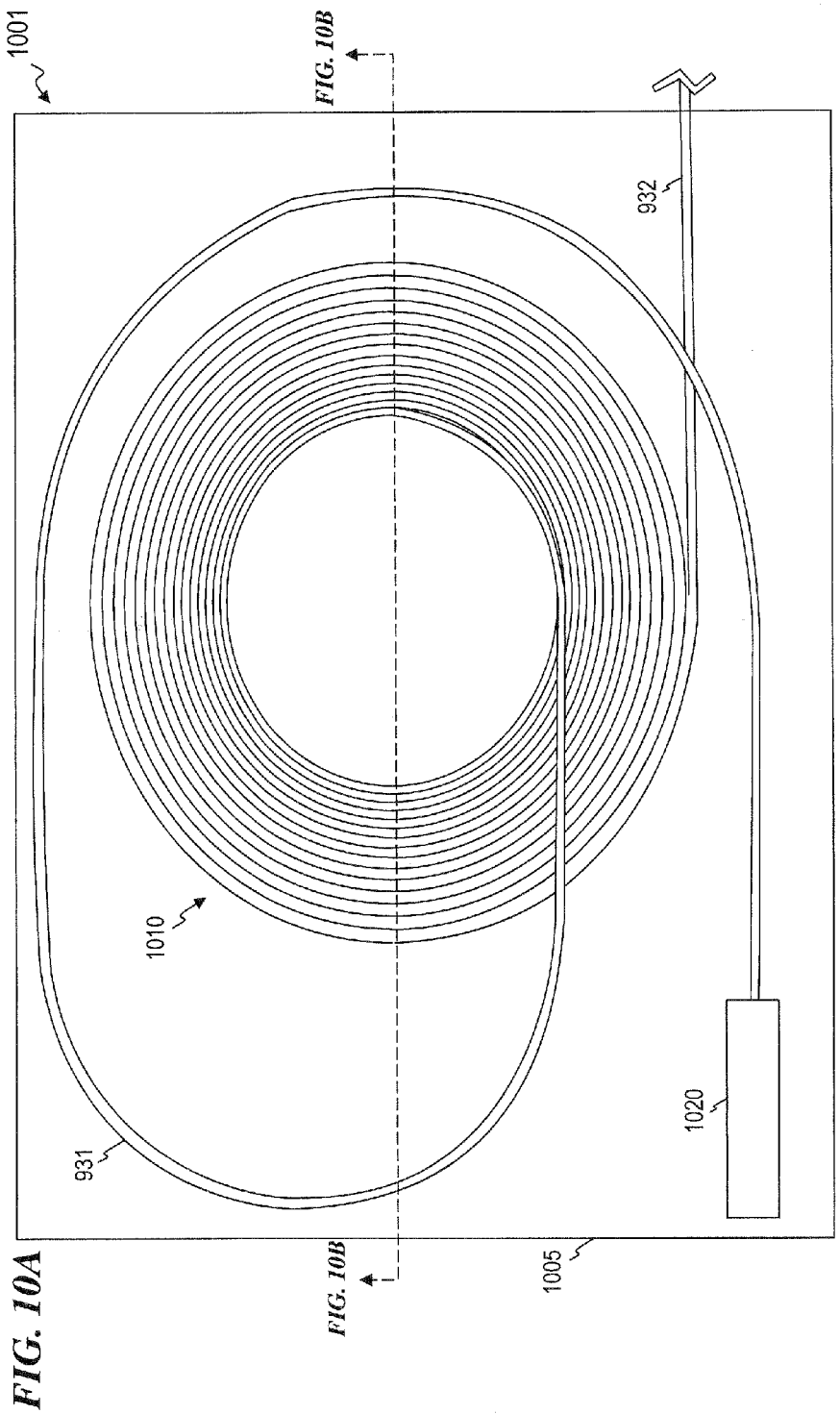
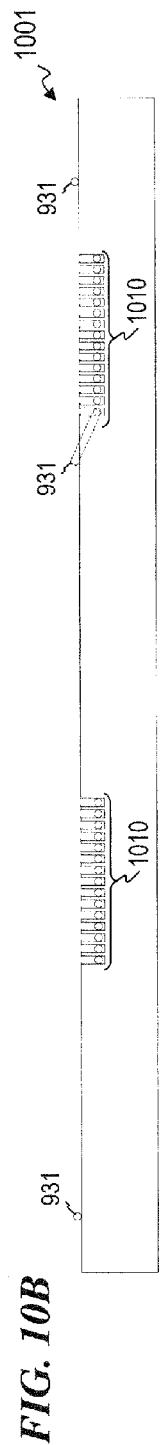
FIG. 10A
FIG. 10B

FIG. 12B

| | Fiber Length (m) | Linewidth (GHz) | $P_{max}$ (W) | $M^2$ X | $M^2$ Y |
|---|---|---|---|---|---|
| Hybrid 1 | 5.9+3.5+.5 | 12 | 1045 | 1.027 | 1.026 |
| Hybrid 2 | 3.9+3.5+.5 | 12 | 1087 | 1.046 | 1.013 |
| Hybrid 3 | 2.9+3.5+.5 | 5 | 1075 | 1.039 | 1.012 |
| Hybrid 4 | 1.9+5.5+.5 | 8 | 1030 | 1.05 | 1.146 |
| Hybrid 5 | 1.3+5.5+.5 | 8 | 930 | 1.074 | 1.1 |

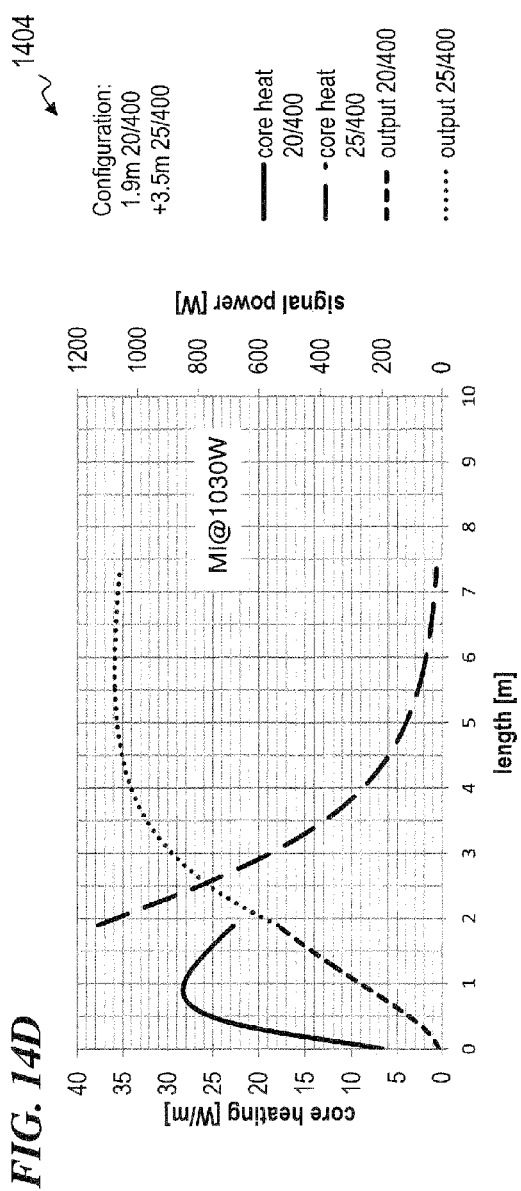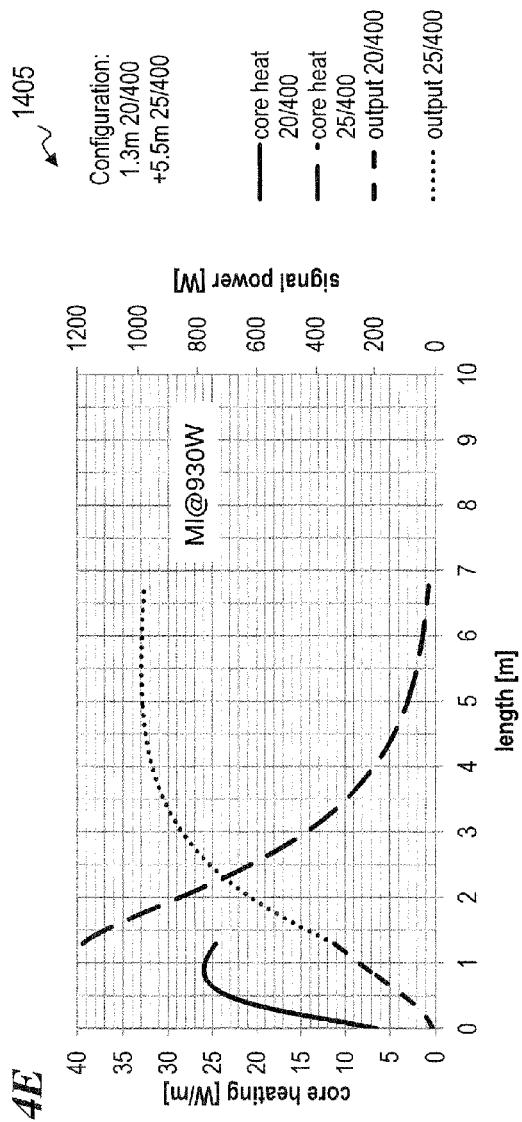
FIG. 14D
FIG. 14E

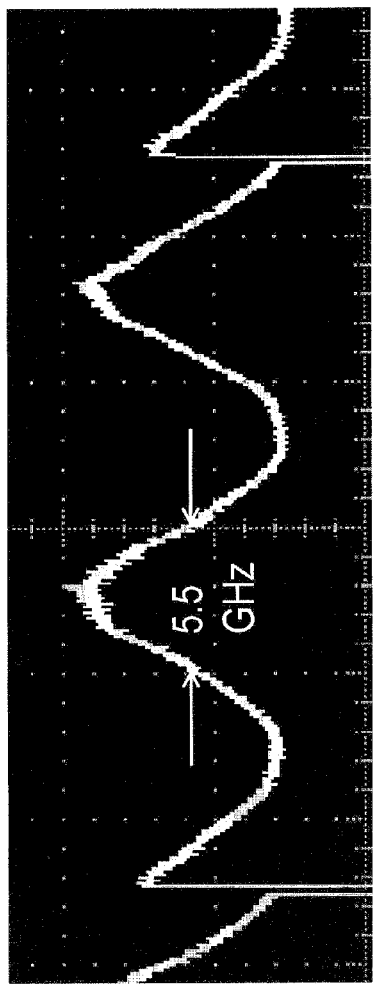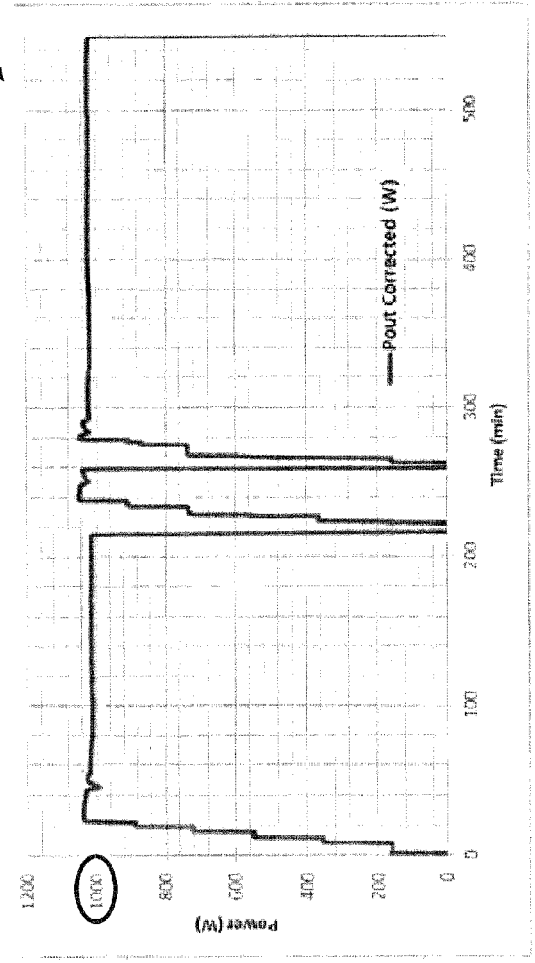
FIG. 15A
FIG. 15B

FIBER AMPLIFIER SYSTEM FOR SUPPRESSION OF MODAL INSTABILITIES AND METHOD

CROSS-REFERENCE TO RELATED APPLICATIONS

This invention is related to:

U.S. Pat. No. 7,391,561 issued Jun. 24, 2008 to Fabio Di Teodoro et al., titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD,"

U.S. Pat. No. 7,768,700 issued Aug. 3, 2010 to Matthias P. Savage-Leuchs, titled "METHOD AND APPARATUS FOR OPTICAL GAIN FIBER HAVING SEGMENTS OF DIFFERING CORE SIZES,"

U.S. Pat. No. 7,876,803 issued Jan. 25, 2011 to Fabio Di Teodoro et al., titled "HIGH-POWER, PULSED RING FIBER OSCILLATOR AND METHOD,"

U.S. Patent Application Publication 2011/0122895 published May 26, 2011 by Matthias P. Savage-Leuchs et al., titled "Q-SWITCHED OSCILLATOR SEED-SOURCE FOR MOPA LASER ILLUMINATOR METHOD AND APPARATUS" (which issued as U.S. Pat. No. 8,934,509 on Jan. 13, 2015), U.S. Pat. No. 8,441,718 issued May 14, 2013 by Roy D. Mead, titled "SPECTRALLY BEAM COMBINED LASER SYSTEM AND METHOD AT EYE-SAFER WAVELENGTHS," and U.S. Pat. No. 8,493,651 issued Jul. 23, 2013 to Yongdan Hu et al., titled "APPARATUS FOR OPTICAL FIBER MANAGEMENT AND COOLING," each of which is incorporated herein by reference in its entirety.

FIELD OF THE INVENTION

The invention relates generally to high-power optical fiber amplifiers and lasers and more particularly to methods and apparatus for fiber amplifier systems and methods that suppress modal instabilities.

BACKGROUND OF THE INVENTION

Fiber lasers are of great current interest for high-power laser applications. Many of these applications utilize the coherence of the laser light and thus require controlled polarization and narrow linewidth output radiation, such as for coherent LIDAR, frequency conversion or beam combining via spectral or coherent combining techniques. The narrow linewidth and polarized output can limit power scaling of the fiber laser output due to a number of effects.

The limitations of fiber lasers include nonlinearities (e.g., Stimulated Brillouin Scattering (SBS)) and Modal Instabilities (MI). For example, in some cases, modal instabilities in Large-Mode-Area (LMA) high-power fiber amplifiers limit power scaling from individual fibers. LMA fibers typically support several transverse modes, but are preferentially operated with the majority of the light in the fundamental (LP01) mode to optimize beam quality. The modal instability can transfer power out of the LP01 mode to a higher order mode, degrading beam quality. In some cases, this transfer to higher order mode(s) may result in light being coupled out of the core into the fiber cladding, limiting output power. With regard to nonlinearities, some of the techniques used to avoid SBS (e.g., larger core size and reduced fiber length) may result in MI.

Papers and presentations reporting on modal instabilities in high power fiber amplifiers include A. Smith, J. J. Smith, "*Mode Instability in High Power Fiber Amplifiers*," Optics Express 19, 10180-10192 (2011) (hereinafter, "A. Smith et al."); C. Jauregui, T. Eidam, J. Limpert, and A. Tünnermann, "*The impact of modal interference on the beam quality of high-power amplifiers*," Opt. Express 19, 3258-3271 (2011) (hereinafter, "C. Jauregui et al."); and J. Edgecumbe, Nufern, "*Single Mode, High Power, Narrow Line-width Fiber Amplifiers*," $2^{4th}$ Solid State and Diode Laser Technology Review (2011) (hereinafter, "J. Edgecumbe"), each of which is incorporated herein by reference in its entirety. Recent reports in the literature such as the papers identified above indicate a possible thermal origin for modal instabilities (e.g., thermal load per unit length of the fiber) and the likely role of induced gratings by interactions between fundamental mode and higher order mode content.

Teemu Kooki et al., "*Fiber amplifier utilizing an Yb-doped large-mode-area fiber with confined doping and tailored refractive index profile*," Proc. SPIE 7580, Fiber Lasers VII: Technology, Systems, and Applications, 758016 (Feb. 17, 2010) (hereinafter, "Kooki et al.") is incorporated herein by reference in its entirety. Kooki et al. describe power scaling of Yb-doped large-mode-area fibers drives the scaling of the mode area in order to suppress nonlinearities. Two Yb-doped large-mode-area fibers were manufactured using the Direct Nanoparticle Deposition process: one with a step refractive index profile and active ion confinement, and another with a tailored refractive index and active ion confinement. The index tailoring and doping profiles were designed based on literature to enhance the beam quality of the fibers. Both fibers exhibited a mode field diameter comparable to a 40 μm step index fiber with 0.07 NA. The fibers were characterized for their geometries, index profiles, and material composition profiles. Additional testing for beam quality and nonlinearities in pulsed operation was conducted using a power amplifier setup. The beam quality enhancement capability of the tested fibers was inconclusive due to incomparable launching conditions of the signal to the fibers.

U.S. Pat. No. 4,829,529 to James D. Kafka (hereinafter, "Kafka") titled "LASER DIODE PUMPED FIBER LASERS WITH PUMP CAVITY", issued May 9, 1989, and is incorporated herein by reference in its entirety. Kafka describe a fiber laser having a single mode fiber core of laser material is pumped by a high power coherent laser diode source by providing a multi-mode fiber around the single mode core to define a pump cavity which propagates pump radiation while allowing the pump radiation to couple to the single mode core. Laser diode arrays and extended emitter laser diodes can be used to pump a single mode fiber by inputting the pump radiation into the multi-mode fiber surrounding the single mode fiber core. The multi-mode [sic] fiber has a much greater diameter than the single mode core.

U.S. Pat. No. 5,508,842 to Keiko Takeda et al. (hereinafter, "Takeda et al.") titled "OPTICAL AMPLIFIER", issued Apr. 16, 1996, and is incorporated herein by reference in its entirety. Takeda et al. describe an optical amplifier for amplifying a signal light by propagating the signal light and a pumping light in a rare earth element doped fiber doped with a rare earth element. A diameter of a rare earth element doped portion of the rare earth element doped fiber is gradually reduced in a direction of propagation of the pumping light. With this construction, an adverse rare earth element doped area which does not contribute to optical amplification, but rather attenuates the pumping light, can be eliminated to thereby provide an optical amplifier having increased amplification efficiency.

U.S. Pat. No. 5,708,669 to David John DiGiovanni et al. (hereinafter, "DiGiovanni et al. '669") titled "ARTICLE COMPRISING A CLADDING-PUMPED OPTICAL FIBER LASER", issued Jan. 13, 1998, and is incorporated herein by reference in its entirety. DiGiovanni et al. '669 describe a cladding pumped optical fiber laser comprises a length of optical fiber having a rare earth-doped region of diameter $d_{RE} > d_{01}$ where $d_{01}$ is the mode diameter of the $LP_{01}$ mode of the fiber at the laser radiation at wavelength $\lambda$. In one embodiment the fiber has a core diameter $d_c$ selected such that the $LP_{01}$ mode is the only guided spatial mode of the fiber, and $d_{RE}$ is greater than $d_c$. In another embodiment the fiber supports at least one higher order guided spatial mode, typically $LP_{11}$ or $LP_{02}$, and $d_{RE}$ is approximately equal to or larger than $d_c$. Currently preferred embodiments comprise a grating-defined laser cavity that comprises a mode-coupling refractive index grating. Cladding pumped lasers according to the invention will typically have efficient conversion of pump radiation to laser radiation, and consequently can typically be shorter than analogous prior art cladding pumped lasers.

U.S. Pat. No. 5,864,644 to David John DiGiovanni et al. (hereinafter, "DiGiovanni et al. '644") titled "TAPERED FIBER BUNDLES FOR COUPLING LIGHT INTO AND OUT OF CLADDING-PUMPED FIBER DEVICES", issued Jan. 26, 1999, and is incorporated herein by reference in its entirety. DiGiovanni et al. '644 describe light coupled from a plurality of semiconductor emitters to a cladding-pumped fiber via tapered fiber bundles fusion spliced to the cladding-pumped fiber. Individual semiconductor broad stripe emitters can be coupled to individual multimode fibers. The individual fibers can be bundled together in a close-packed formation, heated to melting temperature, drawn into a taper and then fusion spliced to the cladding-pumped fiber. The taper is then overcoated with cladding material such as low index polymer. In addition, a fiber containing a single-mode core can be included in the fiber bundle. This single-mode core can be used to couple light into or out of the single-mode core of the cladding-pumped fiber.

U.S. Pat. No. 6,289,027 to Brian L. Lawrence et al. (hereinafter, "Lawrence et al.") titled "FIBER OPTIC LASERS EMPLOYING FIBER OPTIC AMPLIFIERS", issued Sep. 11, 2001, and is incorporated herein by reference in its entirety. Lawrence et al. describe ring and linear cavity, fiber optic laser systems employing non-invasive fiber optic amplification technology. A channel overlay waveguide is employed for amplification of optical energy evanescently coupled to the overlay waveguide from the fiber optic. One of two amplification methods can be employed. The first involves inducing stimulated emission with the overlay waveguide and the second uses a second order, non-linear frequency conversion to down-convert a high-power, short-wavelength pump signal into the waveguide to amplify the optical energy coupled thereto. Amplification of optical energy in the channel overlay waveguide can be established within a single beat length of evanescent removal to evanescent return of the optical energy to the fiber optic. Intra-cavity elements can be employed to effect, e.g., wavelength selection, optical isolation, or modulation of the resultant, optical signal propagating in the fiber optic.

U.S. Pat. No. 6,324,326 to Matthew J. Dejneka et al. (hereinafter, "Dejneka et al.") titled "TAPERED FIBER LASER", issued Nov. 27, 2001, and is incorporated herein by reference in its entirety. Dejneka et al. describe a tapered fiber laser having a multi-mode section, a single-mode section, and either a tapered section or fundamental mode matching junction therebetween. The multi-mode section has a large core to directly receive pump light from a broad stripe laser or diode bar, and a length preferably longer than the absorption length of the pump light (so optical amplification occurs predominantly in the multi-mode section). Doping levels can be increased to reduce the multi-mode length. The taper angle is sufficiently small to produce adiabatic compression of the fundamental mode from the multi-mode to single-mode sections, and acts as a cutoff filter favoring lasing of the fundamental mode within the multi-mode section. Alternately, the step junction may have a mode field diameter matched to the lowest-order mode, with laser light output via the single-mode section. The invention can be applied to waveguides (particularly those having an aspect ratio corresponding to a broad stripe laser source), doped with ytterbium or neodymium ions, and is particularly advantageous as a pump source for an erbium-doped fiber amplifier (EDFA).

U.S. Pat. No. 6,970,624 to David J. DiGiovanni et al. (hereinafter, "DiGiovanni et al. '624") titled "CLADDING PUMPED OPTICAL FIBER GAIN DEVICES", issued Nov. 29, 2005, and is incorporated herein by reference in its entirety. DiGiovanni et al. '624 describe optical fiber gain devices, such as lasers and amplifiers, wherein losses due to a large step transition between an input section and a gain section are reduced by inserting an adiabatic transformer between the input section and the gain section. In the preferred case the adiabatic transformer comprises a GRadient INdex (GRIN) lens. The lens serves as an adiabatic beam expander (reducer) to controllably increase (reduce) the modefield of the beam as it travels through the step transition.

U.S. Pat. No. 7,557,986 to Yoav Sintov (hereinafter, "Sintov") titled "HIGH POWER FIBER AMPLIFIER", issued Jul. 7, 2009, and is incorporated herein by reference in its entirety. Sintov describes a high power fiber amplifier including a double clad fiber including a protective outer jacket (41), an outer clad (44), an inner clad (42, 35) and a doped core (43, 34, 32), and a source of pump power coupled to the inner clad through coupling optics (22) and at least one of a side-fiber coupling section and an end-fiber coupling section, wherein the inner clad includes a large diameter core portion (34), operative as a high power amplification stage, capable of absorbing the majority of the pump power, and a small diameter core portion (32), operative as a low power amplification stage, wherein both core portions, pumped through the inner clad (35), are serially connected through an optical interface point (37).

U.S. Pat. No. 7,809,236 to Martin H. Muendel (hereinafter, "Muendel") titled "OPTICAL FIBER HOLDER AND HEAT SINK", issued Oct. 5, 2010, and is incorporated herein by reference in its entirety. Muendel describes an optical fiber holding device having an optical fiber held therein. The device has a base with a spiral channel in an upper surface holding and housing the optical fiber. The channel has a first location where the fiber enters leading to a plurality of turnings for holding the optical fiber wrapped there-around at another end a second location where the fiber exits the channel wherein the bend radius of the optical fiber housed within the spiral channel is at least 2 cm. The dimensions are such that housing forms a heat sink allowing heat within the fiber to dissipate within the base. The spiral channel is preferably designed to keep the fiber within the channel and to prevent it from inadvertently springing out spring tension of the bent fiber holds the fiber within the groove or channel.

Accordingly, there is a need in the art for improved fiber amplifier systems that suppress modal instabilities.

SUMMARY OF THE INVENTION

In some embodiments, the inventors have found that polarization-maintaining (PM) fibers appear to have much lower power threshold for modal instabilities when compared to non-PM fibers, and the variations observed in experimental measurements are consistent with a thermal origin for the modal instabilities (MI). For example, in some embodiments, the inventors noted MI at around 650 watts (W) in PM 25/400 fiber (i.e., a PM fiber having a 25-micron-diameter core and 400-micron outer-cladding diameter), and no MI observed up to 1070 W output power in non-PM 25/400 fiber. In some embodiments, it was also determined that smaller core fibers have a higher power threshold for MI (e.g., in some embodiments, 20/400 fiber was found to have a higher power threshold for MI than 25/400 fiber).

In some embodiments, thermal effects drive the MI process, and in some such embodiments, the present invention provides a plurality of options for mitigating these thermal effects. In some embodiments, the present invention provides a hybrid fiber with a smaller core in the initial length where the thermal loads are highest, followed by a larger-core fiber. In some embodiments, the hybrid fiber of the present invention avoids or minimizes modal instabilities while yielding almost the same performance as compared to conventional fibers with regard to minimizing SBS.

In some embodiments, the present invention provides a hybrid-fiber design having a smaller core at the end where the pump light is introduced and a larger core for the remainder of fiber length needed to absorb the pump light. In some embodiments the length of the smaller core fiber is chosen such that the thermal heat load in the larger core fiber is below the heat load that produces modal instabilities. In some embodiments, in an amplifier with the pump and signal light co-propagating, the initial 2-5 meters includes 20/400 fiber and the remaining length includes 25/400 fiber. In some embodiments, the hybrid-fiber design further includes a fiber mandrel design that provides optimized cooling of the fiber, along with a fiber coil diameter that increases from the input to the output of the fiber such that modal distortions are minimized at the output end of the fiber where power levels are maximized.

In some embodiments, the present invention optimizes the core/cladding diameter to balance the effects of thermal-load-per-unit-length of fiber (in some embodiments, controlling thermal load helps avoid modal instabilities) and fiber length (in some embodiments, the longer the fiber length, the more increased the potential for SBS). For example, in some embodiments, a 25/400 fiber shows modal instability at 400-700 W output operating at a linewidth of 5 GHz, while a 20/400 fiber does not show any modal instability up to 1000 W of output power, but the 20/400 fiber is limited by SBS to at least 12 GHz of linewidth. In some embodiments, an intermediate core size of 22 microns is used to balance these two effects.

In some embodiments, the present invention uses signal wavelengths closer to the pump wavelength to reduce the quantum defect heating. For example, in some embodiments the laser signal wavelength can be chosen to be 1030 nm instead of 1060 nm in order to reduce the heating from 1−976/1060=8% to 1−976/1030=5%. In some embodiments, the present invention uses long-wavelength pumping to reduce the quantum defect heating. For example, in some embodiments, instead of pumping at the peak absorption of 976 nm, the present invention uses pump wavelengths centered around 1010 or 1020 nm. In some embodiments, for a laser with a signal wavelength of 1060 nm, this reduces the heating from 1−976/1060=8% to 1−1020/1060=4% or even 1−1020/1030=1% of the absorbed pump light. In some embodiments, the absorption cross section is reduced for this long wavelength pumping and therefore, in some embodiments, the amplifier includes a smaller cladding diameter and higher-brightness pump diodes to absorb the pump light with a given fiber length.

In some embodiments, the present invention pumps from both ends of a fiber amplifier in order to reduce the peak thermal load. In some embodiments, pumping is at a first end of the fiber amplifier and the pump light is reflected at the opposite second end of the fiber amplifier. In some such embodiments, this pump/reflect configuration is used with a lower absorption (i.e. smaller core/cladding ratio) fiber to avoid the modal instability but reduced fiber length (and increase the threshold for nonlinearity) compared to the typical unreflected pump light performance with that core/cladding ratio. In some embodiments, pump light is inserted into the fiber amplifier at multiple points along the length of the fiber, rather than simply the input or output ends of the fiber. In some such embodiments, in order to maintain the same overall fiber length, the cladding diameter is reduced to increase the effective absorption length, and the overall length of the fiber is the same compared to the end-pumped fiber design, but the peak thermal load is reduced.

In some embodiments, the present invention provides a fiber with a longitudinally increasing pump-light-absorption value, either by geometry or concentration of rare-earth ion.

BRIEF DESCRIPTION OF THE FIGURES

Each of the items shown in the following brief description of the drawings represents some embodiments of the present invention.

FIG. 10A is a top-view schematic diagram of a spiral-mandrel assembly 1001 configured to provide optimized cooling for a hybrid gain fiber.

FIG. 10B is a cross-sectional-view schematic diagram of spiral-mandrel assembly 1001.

FIG. 12B is a table 1202 of fiber-amplifier data for various hybrid-fiber configurations as a function of 20/400 fiber length.

FIG. 14D is a graph 1404 illustrating heat-load characteristics of a hybrid-fiber configuration that includes 1.9 meters of PM 20/400 fiber and 3.5 meters of PM 25/400 fiber.

FIG. 14E is a graph 1405 illustrating heat-load characteristics of a hybrid-fiber configuration that includes 1.3 meters of PM 20/400 fiber and 5.5 meters of PM 25/400 fiber.

FIG. 15A is a graph 1501 showing the signal linewidth associated with one of the hybrid-fiber embodiments of the present invention as measured by a Scanning Fabry Perot spectrometer.

FIG. 15B is a graph 1502 of an 8-hour life test of a hybrid-fiber amplifier system according to some embodiments of the present invention.

DETAILED DESCRIPTION OF THE INVENTION

Figure 1:
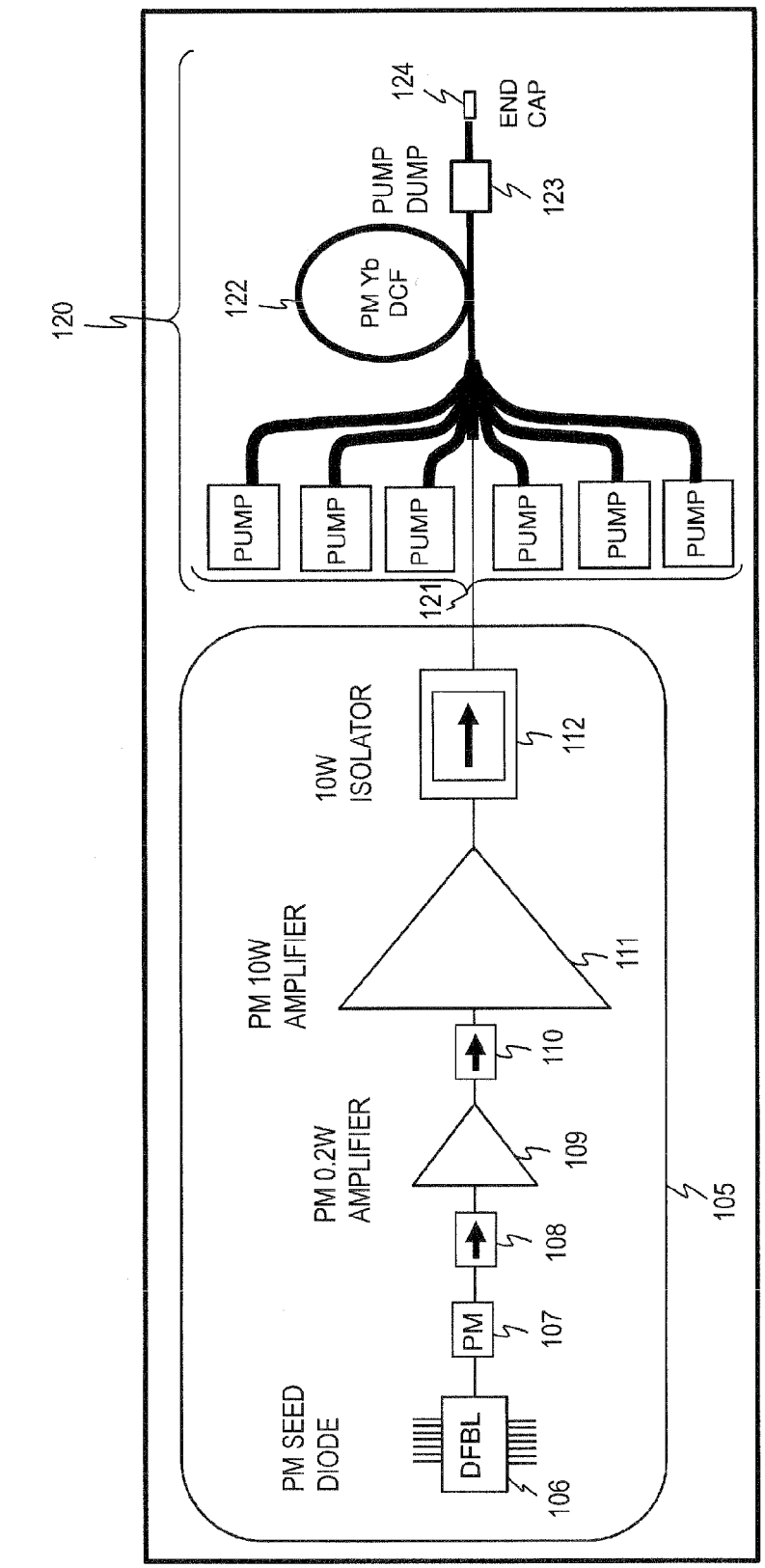
FIG. 1 is a schematic diagram of a fiber laser system 101, according to some embodiments of the present invention.

Although the following detailed description contains many specifics for the purpose of illustration, a person of ordinary skill in the art will appreciate that many variations and alterations to the following details are within the scope of the invention. Very narrow and specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

The power scaling limits of conventional ytterbium (Yb) fiber amplifiers include a threshold power for fiber nonlinearities (e.g., SBS) that is approximated by the ratio of the effective fiber area to the effective fiber length ($A_{eff}/L_{eff}$), where the effective fiber length includes contribution from both the Yb-doped gain fiber and the delivery fiber. In addition, SBS generally requires larger linewidth for higher powers, limiting power scaling for narrow line width fiber lasers and amplifiers. For suppression of nonlinearities such as SBS, larger core fibers can provide higher output due to the larger effective mode area and increased absorption per unit length arising from a larger core/cladding ratio.

However, in some embodiments, a larger core fiber can have a lower power threshold for modal instabilities compared to a smaller fiber. For example, in some embodiments, fiber amplifiers fabricated from a single length of PM 20/400 fiber (i.e., using a PM fiber having a 20-micron-diameter core and 400-micron outer-cladding diameter) and pumped at 977 nm (with no additional delivery fiber) produce about one kilowatt (1 kW) and have limited SBS at twelve Gigahertz (12 GHz) linewidth, and, in some embodiments, 25/400 fiber of similar nominal materials and fabrication method can operate at a smaller linewidth due to the larger core area and reduced fiber length enabled by the higher absorption-per-unit-length but shows modal instabilities at about 650 W (beam quality degrades at an M-squared value of greater than or equal to about 1.1). This results in a tradeoff in the output power being limited by the modal instability for large core fibers and by SBS for smaller core fibers. In some embodiments, therefore, the present invention provides an increase in the overall power possible from a single fiber by (1) balancing the effects of nonlinearities versus modal instability, and (2) increasing the threshold power for the modal instability by reducing the peak thermal load.

Figure 7:
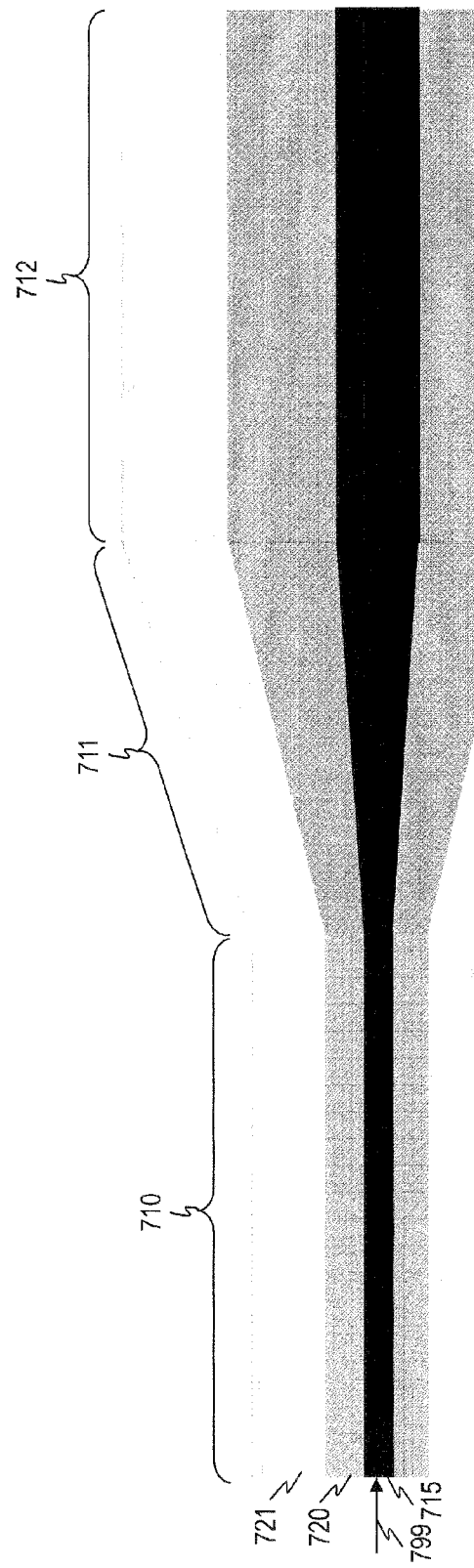
FIG. 7 is a schematic diagram of a hybrid fiber 701 that includes a tapered design to produce a large mode output fiber for mitigation of fiber nonlinearities while also being designed to manage thermal load in order to stay below the threshold for modal instabilities.

In the double-clad embodiments described herein, only the core diameter and a first cladding diameter are specified, but such double-clad embodiments also include a second cladding layer (not shown) outside of the first cladding layer. For example, in some embodiments, a double-clad 20/400 fiber includes a 20-micron diameter core, a 400-micron diameter first cladding, and a 550-micron diameter second outer cladding (in some such embodiments, the second cladding layer includes a low-index polymer inner coating and a protective polymer outer coating). Similarly, for some embodiments using triple-clad fiber, where there is a first and second cladding layer in addition to the core, three numbers specify the diameters of the core, first cladding layer and second cladding layer, but there is also a third cladding layer (not shown) outside of the second cladding layer (e.g., in some embodiments, the outer diameter of the third cladding layer of segment 710 of FIG. 7 is about 350 microns, and the outer diameter of the third cladding layer of segment 712 of FIG. 7 is about 750 microns). The Numerical Aperture (NA) of the inner and outer waveguides is determined by the effective refractive index of the materials in the fiber, including the use of air or vacuum filled sections that change the effective index as well as "air clad" designs to provide high NA confinement of pump light.

FIG. 1 is a schematic diagram of a fiber laser system 101, according to some embodiments of the present invention. In some embodiments, experiments conducted using system 101 achieved 1003 W at a twelve-gigahertz (12-GHz) seed linewidth limited by Stimulated Brillouin Scattering (SBS) before the onset of modal instability. In some embodiments, system 101 has a master-oscillator power-amplifier (MOPA) configuration that includes a seed source 105 (the master oscillator) and a power amplifier module 120. In some embodiments, seed source 105 includes a polarization-maintaining seed diode 106 (in some embodiments, diode 106 is a distributed-feedback laser (DFBL)). In some embodiments, seed source 105 further includes a plurality of optical isolators including isolator 108, isolator 110, and isolator 111, and a plurality of amplifiers including amplifier 109 and amplifier 110. In some embodiments, element 107 of seed source 105 indicates that the optical fiber is polarization maintaining (PM) fiber. In some embodiments, optical isolator 112 is a 10-W isolator. In some embodiments, amplifier 109 is a polarization-maintaining 0.2-W amplifier and amplifier 111 is a polarization-maintaining 10-W amplifier.

In some embodiments, power amplifier 120 includes a plurality of optical pumps 121, gain fiber 122, a pump dump 123, and an output-beam end cap 124. In some embodiments, each pump port 121 delivers about 220 W. In some embodiments, gain fiber 122 is a polarization-maintaining (PM) ytterbium (Yb)-doped double-clad fiber (DCF). In some such embodiments, gain fiber 122 is a PM 20/400 fiber (i.e., a PM fiber having a 20-micron-diameter core and 400-micron outer-cladding outside diameter), the $M^2$ ratio (sometimes referred to herein as the beam quality factor) was determined to be less than about 1.1 (e.g., in some embodiments, the $M^2$ ratio is equal to 1.086/1.082), and the polarization extinction ratio (PER) was determined to be greater than about 15 dB (e.g., in some embodiments, the PER is about 16.3±1.4 dB). In some embodiments, gain fiber 122 is non-PM.

Figure 2:
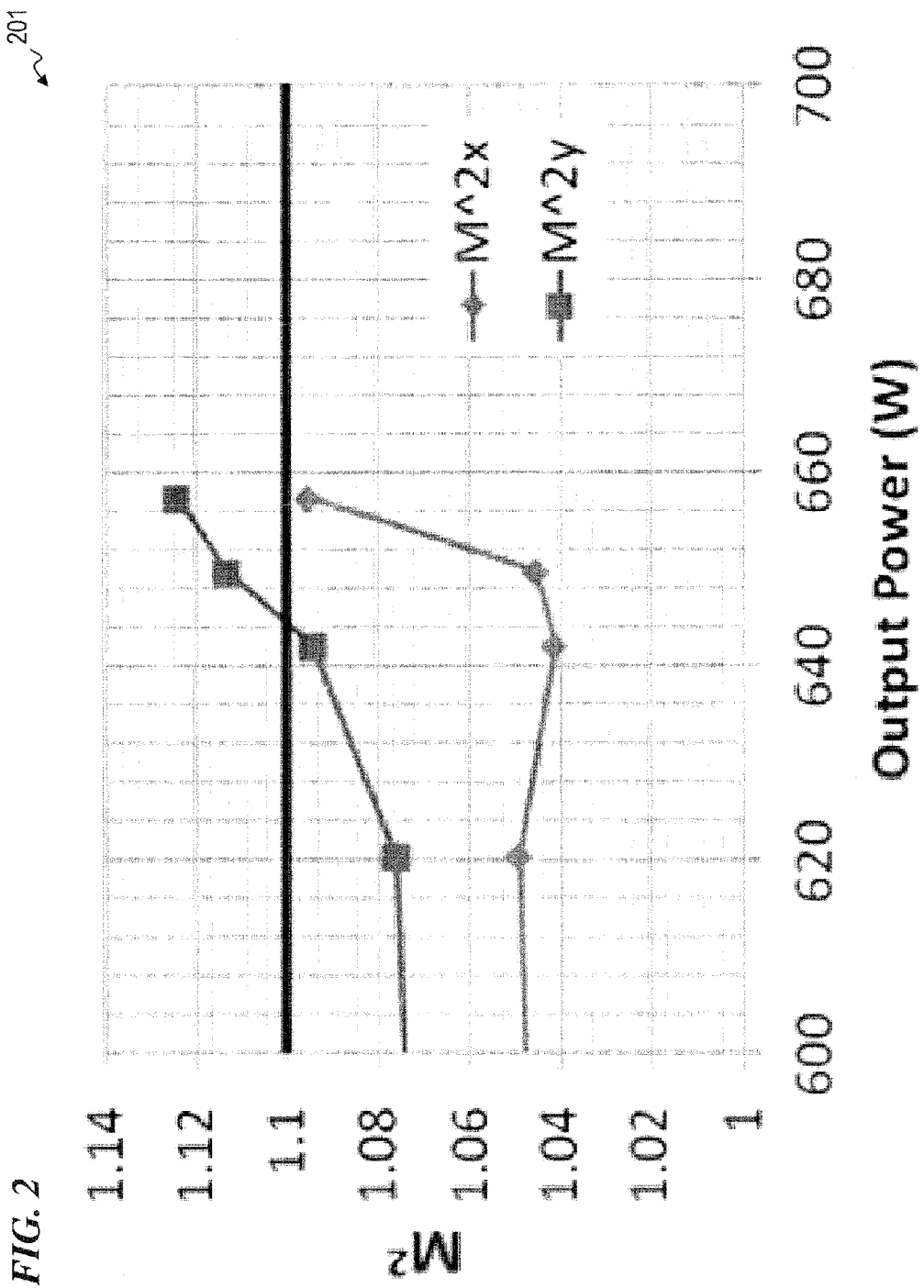
FIG. 2 is a graph 201 illustrating the onset of modal instability and increase in the beam quality factor, $M^2$, based on experiments conducted using a PM 25/400 fiber for gain fiber 222 of system 201.

FIG. 2 is a graph 201 illustrating the onset of modal instability and increase in the beam quality factor, M2, based on experiments conducted using a PM 25/400 fiber for gain fiber 222 of system 201. The x-axis of graph 201 represents the output power of system 101 using PM 25/400 fiber in watts (W) and the y-axis of graph 202 represents the $M^2$ ratio of the beam outputted by the system 101 using PM 25/400 fiber. In some embodiments, the PM 25/400 fiber offers potential for narrower linewidth, but, as shown in graph 202, in some embodiments, modal instability degrades the beam quality at power levels beyond approximately 640 W (e.g., in some embodiments, the onset of modal instability was determined to occur at powers greater than about 642 W).

Figure 3:
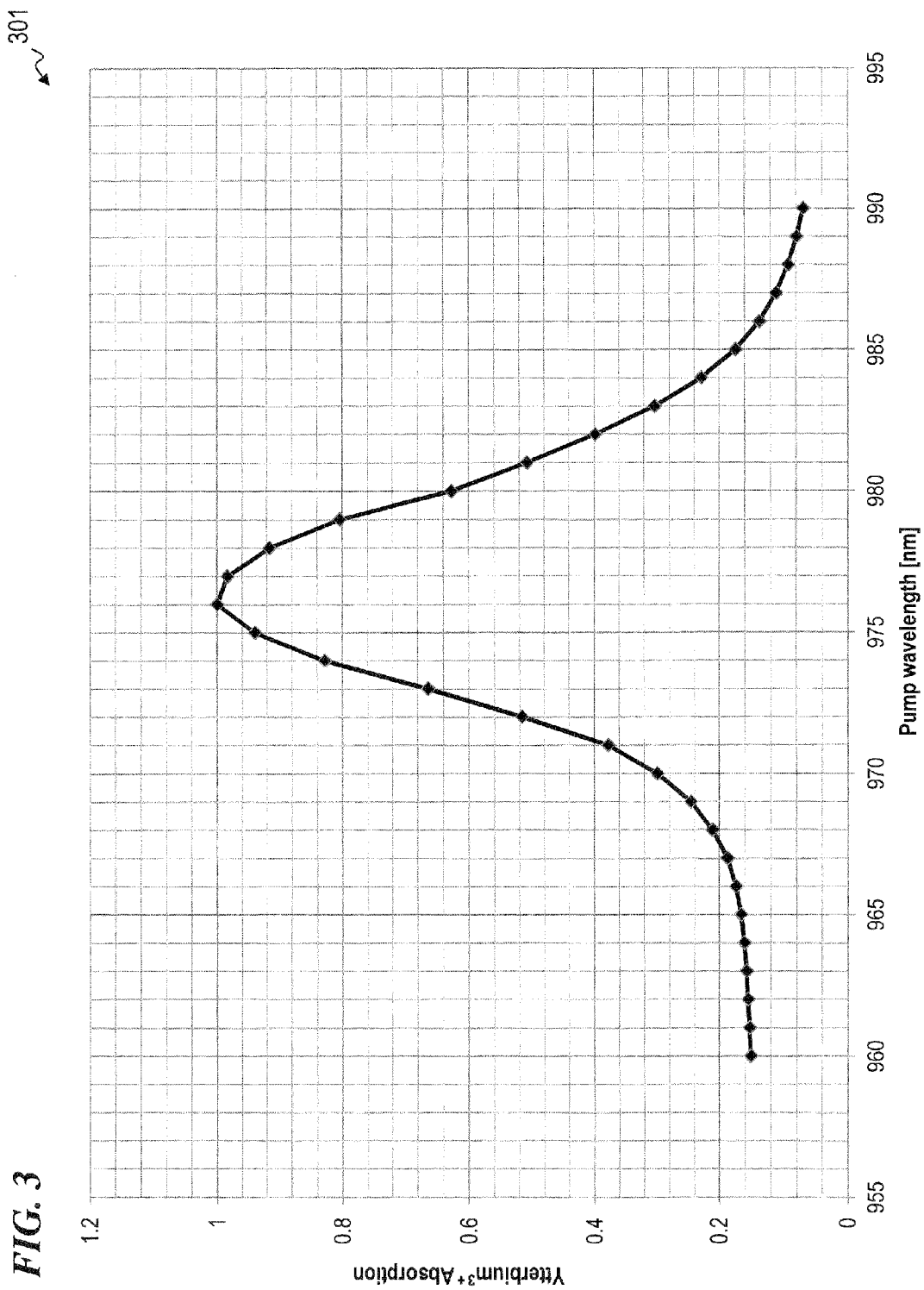
FIG. 3 is a graph 301 showing normalized pump absorption (ytterbium$^{3+}$) versus pump wavelength (nm).

FIG. 3 is a graph 301 showing normalized pump absorption (ytterbium$^{3+}$) versus pump wavelength (nm). In some embodiments, as shown in graph 301, the peak ytterbium$^{3+}$ absorption corresponds with a pump-diode wavelength of about 977 nm. In some embodiments, experiments determined that when the pump-diode wavelength is set to within a range of about 975-978 nm, system 201 using PM 25/400 fiber generates a maximum power of less than 300 W prior to the appearance of modal instability. In some embodiments, experiments determined that when the pump-diode wavelength is set to a value about 971 nm, system 201 using PM 25/400 fiber generates a maximum power of about 360 W prior to the appearance of modal instability. In some embodiments, experiments determined that when pump-diode wavelength is set to a value about 970 nm, system 201 using PM 25/400 fiber generates a maximum power of about 640 W prior to the appearance of modal instability. In some embodiments, the thermal load in the core of a fiber depends on pump wavelength, and thus, in some embodiments, the maximum power data referred to above suggests a thermal origin for PM 25/400 modal instability. In some embodiments, the thermal origin for the modal instabilities is a function of the thermo-optical effect (in some such embodiments, the thermo-optical effect is described by the thermo-optic coefficient, $d_n/d_T$, where n is the refractive index and T is the temperature). The examples shown here are for a Ytterbium-doped fiber but for those with ordinary skill in the art, the results are applicable to other laser systems where thermally induced MIs may limit power scaling, including other rare earth doped fibers and Raman fiber amplifiers.

Figure 4A:
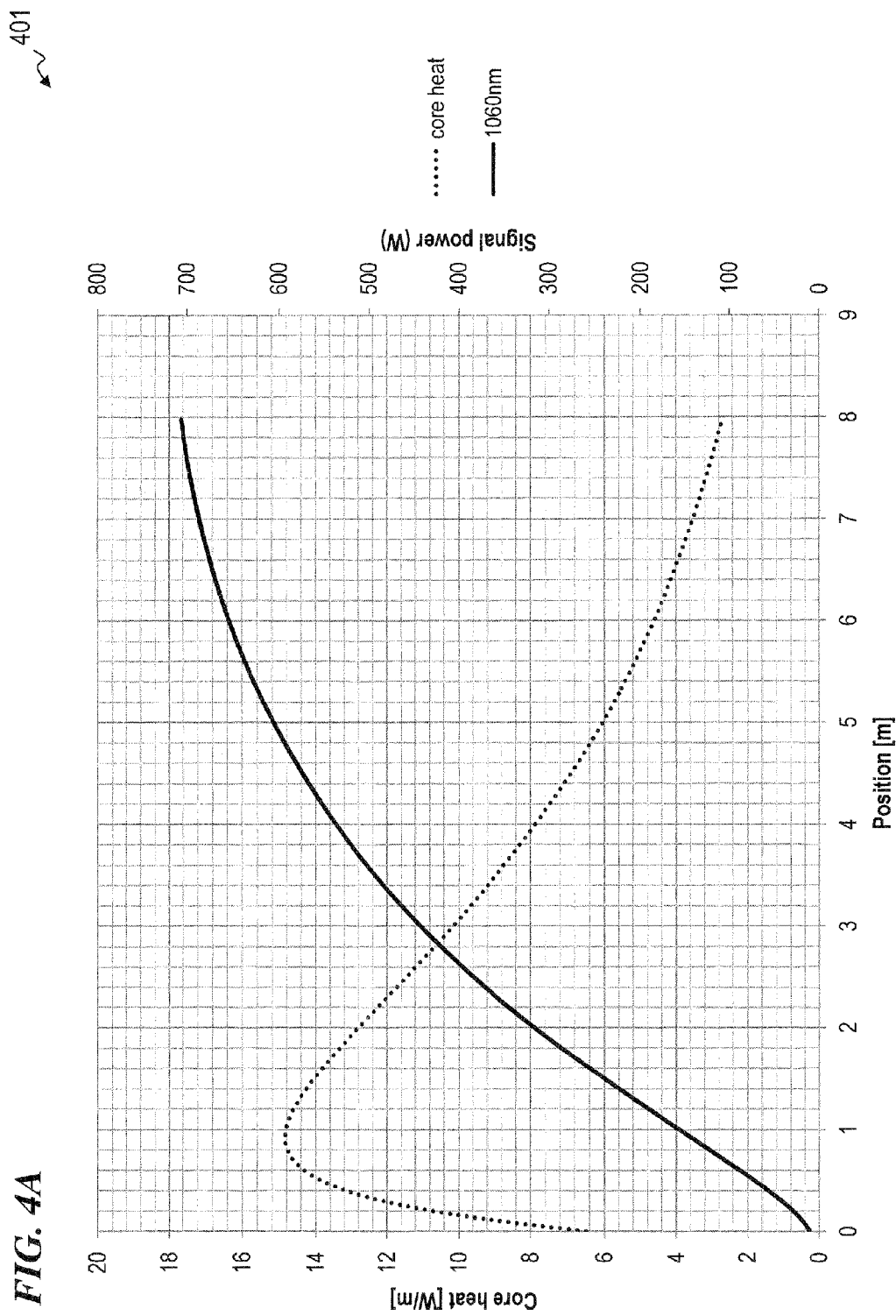
FIG. 4A is a graph 401 showing results of modeling conducted using about 8 meters of a PM 25/400 fiber for gain fiber 222 of system 201, assuming a Ytterbium (Yb)-ion density of $7.74 \times 10^{25}$ ions/m$^3$ and a pump-wavelength distribution centered at 970.0 nm.

Analysis of Experiments with PM 25/400 Gain Fiber Identifies Thermal Onset of MI FIG. 4A is a graph 401 showing results of modeling conducted using about 8 meters of PM 25/400 fiber for gain fiber 222 of system 201, assuming a Ytterbium (Yb)-ion density of 7.74×10$^{25}$ ions/m$^3$ and a pump-wavelength distribution centered at 970.0 nm. In some embodiments, the pump-wavelength distribution is centered at 970.0 nm in order to reduce the effective absorption relative to the peak at about 977 nm. In some embodiments, the values for graph 401 were chosen to simulate the experiment used to produce the data shown in graph 201 of FIG. 2. The x-axis of graph 401 indicates the position along the gain fiber in meters (m), the left-hand y-axis of graph 401 indicates the core heat in watts/meter (W/m), plotted with the dotted curve, and the right-hand y-axis of graph 401 indicates the signal power (W) produced by the gain fiber at a signal wavelength of 1060 nm, plotted as the solid-line curve. The modeling in FIG. 4A shows that the detuned pump wavelength and assumed Yb concentration produces an output power up to about 700 W at a peak core heat loading of about 15 W/m. The modeling results suggest that, in some embodiments, the MI threshold occurs at a core heat load of about 15 W/m.

Figure 4B:
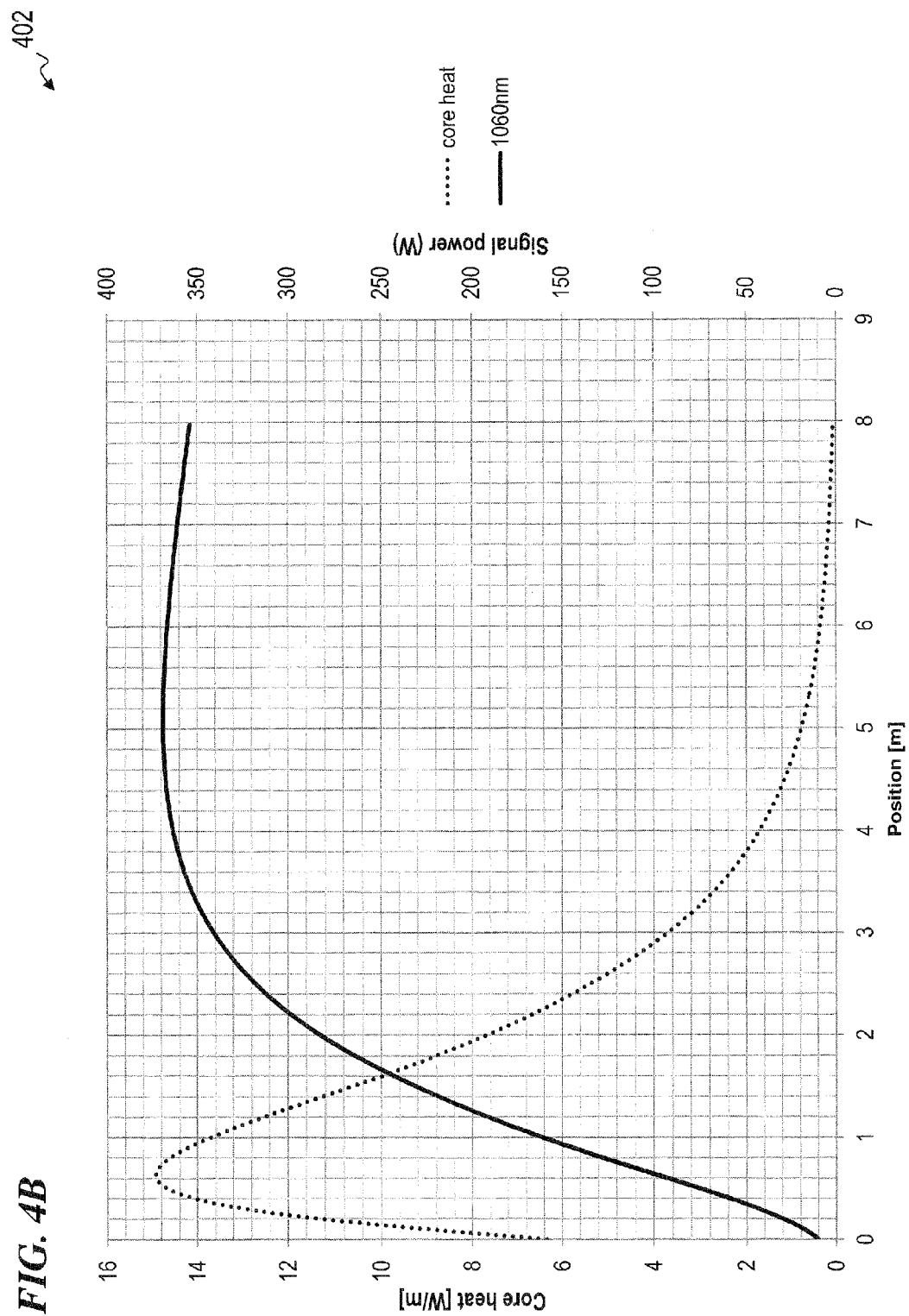
FIG. 4B is a graph 402 showing results of modeling conducted using about 8 meters of a PM 25/400 fiber for gain fiber 222 of system 201, assuming a Yb-ion density of $7.74 \times 10^{25}$ ions/m$^3$ and a pump-wavelength distribution centered at 971.2 nm.

FIG. 4B is a graph 402 showing results of modeling conducted using about 8 meters of a PM 25/400 fiber for gain fiber 222 of system 201, assuming a Yb-ion density of $7.74 \times 10^{25}$ ions/m$^3$ and a pump-wavelength distribution centered at 971.2 nm. In some embodiments, the pump wavelength chosen for the modeling shown in graph 402 is closer to the peak absorption wavelength than the value used in the FIG. 4A model, and, in some embodiments, this results in a higher effective absorption-per-unit-length. The x-axis of graph 402 indicates the position along the gain fiber in meters (m), the left-hand y-axis of graph 402 indicates the core heat load in watts/meter (W/m), plotted with the dotted curve, and the right-hand y-axis of graph 402 indicates the signal power (W) produced by the gain fiber at a signal wavelength of 1060 nm, plotted as the dashed curve. The modeling in FIG. 4B shows that the pump wavelength of 971.2 nm and assumed Yb-concentration produces an output power of about 350 W at a peak core heat loading of about 15 W/m. The modeling inputs for the results in FIG. 4B are chosen to match experimental measurements of the threshold power for the onset of modal instabilities. The modeling results shown in FIGS. 4A and 4B suggest that, in some embodiments, the modal-instability threshold occurs at a core heat load of about 15 W/m with different pump conditions and different output powers and represents a maximum core heat load for the PM 25/400 fiber in some embodiments.

Figure 4C:
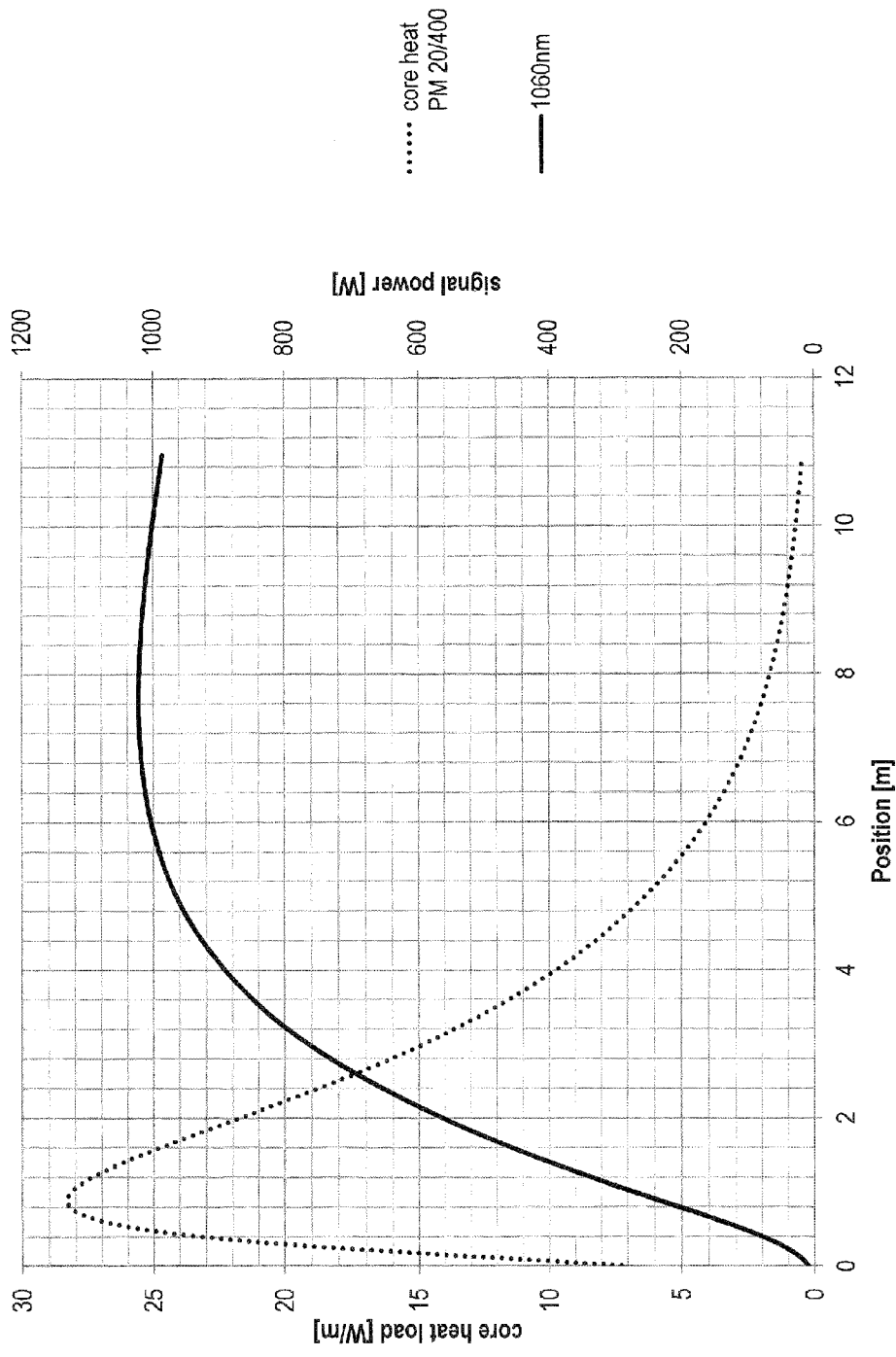
FIG. 4C is a graph 403 showing core heating (W/m) and signal power (W) versus fiber position for a PM 20/400 fiber used as gain fiber 222 of system 201 and a pump distribution centered at 976 nm.

FIG. 4C is a graph 403 showing core heating (W/m) and signal power (W) versus fiber position for a PM 20/400 fiber used as gain fiber 222 of system 201 and a pump distribution centered at 976 nm. The x-axis of graph 403 indicates the position along the length of the fiber in meters, the left-hand y-axis of graph 403 indicates the core heat load (W/m), and the right-hand y-axis indicates the signal power (W) produced by the fiber at a signal wavelength of 1060 nm. In some embodiments, it was determined that 28 W/m does not lead to modal instabilities for the PM 20/400 configuration illustrated by graph 403. In some embodiments, the PM 20/400 gain fiber of FIG. 4C showed a higher threshold for modal instabilities as compared to the PM 25/400 gain fiber of FIGS. 4A-4B, even for a thermal load that caused modal instabilities in the PM 25/400 fiber. For example, in some embodiments, the PM 20/400 fiber of FIG. 4C was determined to be at least two times (2×) more stable against modal instabilities when compared to the PM 25/400 fiber represented by FIGS. 4A-4B. In some embodiments, it was determined that the results obtained for the PM 20/400 fiber are pump power limited or limited by the onset of nonlinearities such as Stimulated Brillouin Scattering, as opposed to being limited by modal instabilities.

Methods to Overcome Thermal Threshold

In some embodiments, two primary methods are used to manage the thermal threshold related to modal instabilities: (1) modifying the pump-diode wavelength (see, e.g., FIG. 3 and its corresponding description), and (2) modifying the fiber geometry (e.g., modifying the core/clad ratio; see, e.g., FIGS. 5A-5B and their corresponding description).

Figure 5A:
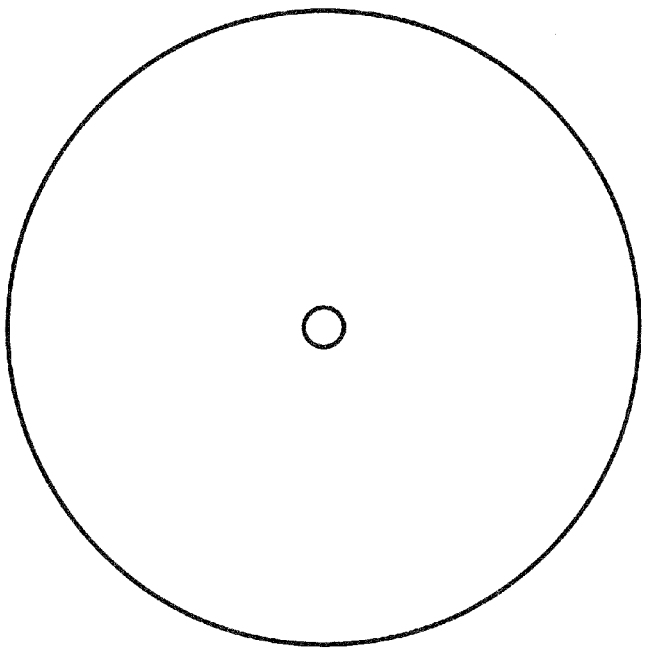
FIG. 5A is a schematic diagram illustrating a fiber geometry 501 used in some embodiments of the present invention.

FIG. 5A is a schematic diagram illustrating a fiber geometry 501 used in some embodiments of the present invention. In some embodiments, geometry 501 includes a PM 20/400 fiber (i.e., a PM fiber having a 20-micron-diameter core and 400-micron outer-cladding outside diameter). In some embodiments, geometry 501 includes a non-PM fiber.

Figure 5B:
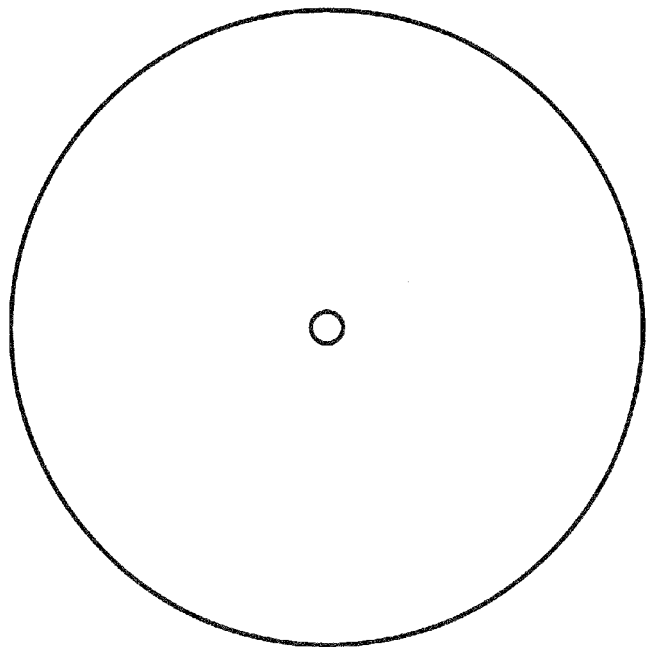
FIG. 5B is a schematic diagram illustrating a fiber geometry 502 used in some embodiments of the present invention.

FIG. 5B is a schematic diagram illustrating a fiber geometry 502 used in some embodiments of the present invention. In some embodiments, geometry 502 includes a PM 25/400 fiber (i.e., a PM fiber having a 25-micron-diameter core and 400-micron outer-cladding outside diameter). In some embodiments, geometry 501 is characterized by a lower heat load for fixed pump wavelength and geometry 502 is characterized by a higher heat load for fixed pump wavelength. In some embodiments, the PM 20/400 fiber represented by geometry 501 works at 1 kilowatt (kW), but requires about 12 gigahertz (GHz) or larger linewidth. In some embodiments, the PM 25/400 fiber represented by geometry 502 enables narrower linewidth output, but also has a lower threshold for modal instability. In some embodiments, geometry 502 includes a non-PM fiber.

Figure 6:
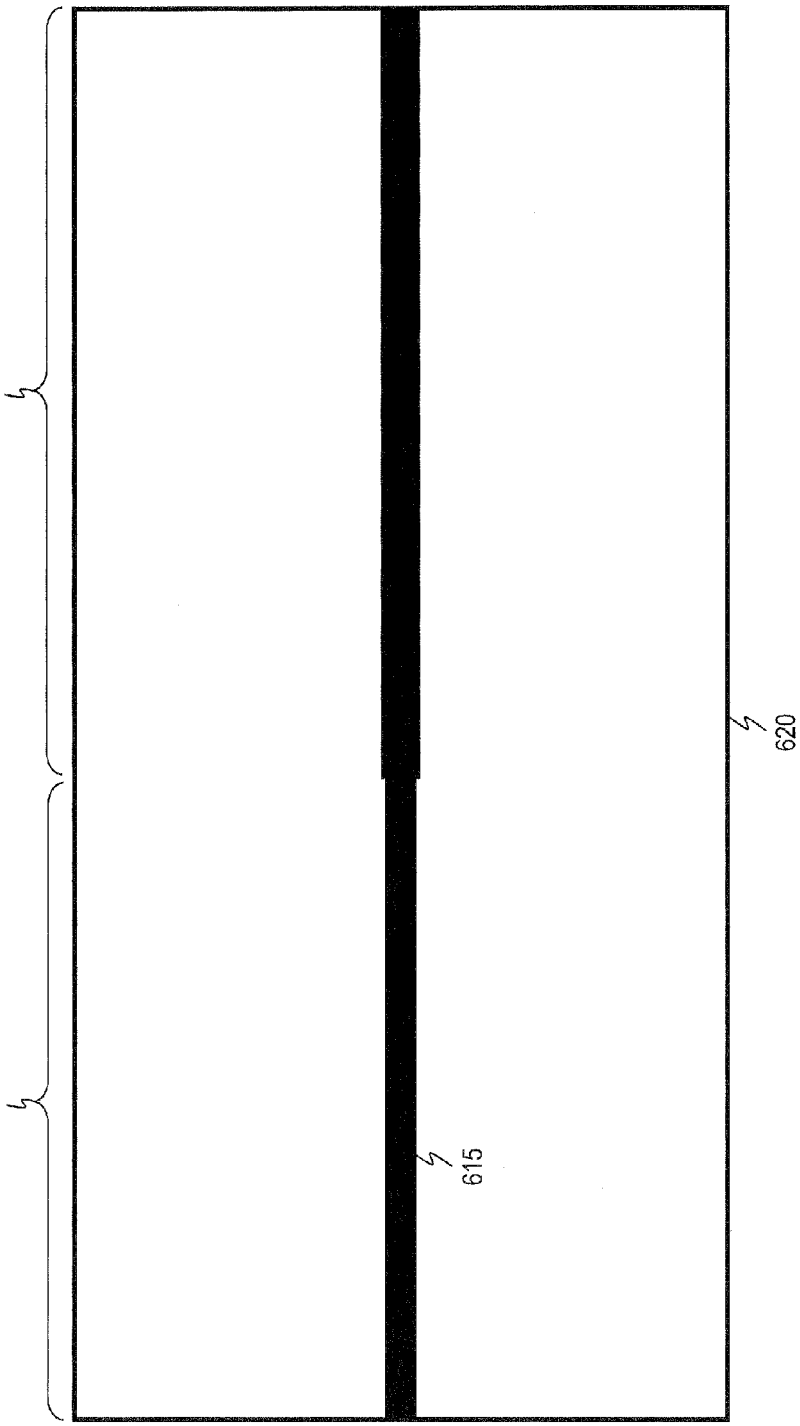
FIG. 6 is a schematic diagram of a hybrid fiber 601 designed to manage thermal load in order to stay below the threshold for modal instabilities.

FIG. 6 is a schematic diagram of a hybrid fiber 601 designed to manage thermal load in order to stay below the threshold for modal instabilities. In some embodiments, fiber 601 is a segmented fiber having a first segment 610 that includes 20/400 Yb-doped-core double-clad fiber and a second segment 611 that includes 25/400 Yb-doped-core double-clad fiber (in some such embodiments, first segment 610 is spliced to second segment 611). Thus, in some embodiments, the core 615 of fiber 601 has a diameter of 20 microns in segment 610 and a diameter of 25 microns in segment 611, and the cladding layer 620 has a diameter of 400 microns throughout fiber 601. In some embodiments, hybrid fiber 601 includes PM fiber. In other embodiments, hybrid fiber 601 includes non-PM fiber.

In some embodiments, first segment 610 includes core diameters of about 5 to 30 microns and second segment 611 includes core diameters larger than the core diameter of 610 with the cladding diameters nominally identical. In some embodiments, first segment 610 includes 5/400 Yb-doped-core double-clad fiber and second segment 611 includes 10/400 Yb-doped-core double-clad fiber. In some embodiments, first segment 610 includes 10/400 Yb-doped-core double-clad fiber and second segment 611 includes 15/400 Yb-doped-core double-clad fiber. In some embodiments, first segment 610 includes 15/400 Yb-doped-core double-clad fiber and second segment 611 includes 20/400 Yb-doped-core double-clad fiber. In some embodiments, first segment 610 includes 20/400 Yb-doped-core double-clad fiber and second segment 611 includes 25/400 Yb-doped-core double-clad fiber. In some embodiments, first segment 610 includes 25/400 Yb-doped-core double-clad fiber and second segment 611 includes 30/400 Yb-doped-core double-clad fiber. In some embodiments, first segment 610 includes 5/400 Yb-doped-core double-clad fiber and second segment 611 includes 15/400 Yb-doped-core double-clad fiber. In some embodiments, first segment 610 includes 10/400 Yb-doped-core double-clad fiber and second segment 611 includes 20/400 Yb-doped-core double-clad fiber. In some embodiments, first segment 610 includes 15/400 Yb-doped-core double-clad fiber and second segment 611 includes 25/400 Yb-doped-core double-clad fiber. In some embodiments, first segment 610 includes 20/400 Yb-doped-core double-clad fiber and second segment 611 includes 30/400 Yb-doped-core double-clad fiber. In some embodiments, first segment 610 includes 25/400 Yb-doped-core double-clad fiber and second segment 611 includes 35/400 Yb-doped-core double-clad fiber. In some embodiments, first segment 610 includes 5/400 Yb-doped-core double-clad fiber and second segment 611 includes 20/400 Yb-doped-core double-clad fiber. In some embodiments, first segment 610 includes 10/400 Yb-doped-core double-clad fiber and second segment 611 includes 25/400 Yb-doped-core double-clad fiber. In some embodiments, first segment 610 includes 15/400 Yb-doped-core double-clad fiber and second segment 611 includes 30/400 Yb-doped-core double-clad fiber. In some embodiments, first segment 610 includes 20/400 Yb-doped-core double-clad fiber and second segment 611 includes 35/400 Yb-doped-core double-clad fiber. In some embodiments, first segment 610 includes 25/400 Yb-doped-core double-clad fiber and second segment 611 includes 40/400 Yb-doped-core double-clad fiber.

In some embodiments, first segment 610 includes a fiber selected from the group consisting of about 5-micron-core Yb-doped-core double-clad fiber (YbDDCF), about 10-micron-core YbDDCF, about 15-micron-core YbDDCF, about 20-micron-core YbDDCF, about 25-micron-core YbDDCF, about 30-micron-core YbDDCF. In some such embodiments, second segment 611 includes a larger core diameter than the core diameter of the adjoining segment 610, wherein the second segment 611 has a core diameter selected from the group consisting of about 10-micron-core YbDDCF, about 15-micron-core YbDDCF, about 20-micron-core YbDDCF, about 25-micron-core YbDDCF, about 30-micron-core YbDDCF, and about 35-micron-core YbDDCF. In some such embodiments, first segment 610 and second segment 611 have cladding diameters selected from the group consisting of about 200-micron outer-cladding diameter, about 250-micron outer-cladding diameter, about 300-micron outer-cladding diameter, about 350-micron outer-cladding diameter, about 400-micron outer-cladding diameter, about 450-micron outer-cladding diameter, about 500-micron outer-cladding diameter, about 550-micron outer-cladding diameter and about 600-micron outer-cladding diameter. In some embodiments, first segment 610 and second segment 611 have different outer-cladding diameters. In some embodiments first segment 610 has a smaller outer-cladding diameter compared to that of second segment 611.

In some embodiments, first segment 610 includes a first length and second segment 611 includes a second length, and, in some embodiments, the first and second lengths are configured such that a thermal load of second segment 611 stays below a value at which a modal-instability occurs (e.g., in some embodiments, a thermal load of 15 W/m is the threshold above which modal-instability occurs). In some such embodiments, the first length of first segment 610 is in a range of about 1 to 10 meters and the second length of second segment 611 is in a range of about 1 to 10 meters. In some embodiments, the first and/or second length is about 1 meter, about 1.5 meters, about 2 meters, about 2.5 meters, about 3 meters, about 3.5 meters, about 4 meters, about 4.5 meters, about 5 meters, about 5.5 meters, about 6 meters, about 6.5 meters, about 7 meters, about 7.5 meters, about 8 meters, about 8.5 meters, about 9 meters, about 9.5 meters, about 10 meters, or, in other embodiments, the first length is any one of the above values and the second length is any one of the above values. In some embodiments, the first length is about 1.3 meters and the second length is about 5.5 meters. In some embodiments, the first length is about 1.9 meters and the second length is about 5.5 meters. In some embodiments, the first length is about 2.9 meters and the second length is about 3.5 meters. In some embodiments, the first length is about 3.9 meters and the second length is about 3.5 meters. In some embodiments, the first length is about 5.9 meters and the second length is about 3.5 meters. In some embodiments, the first length is about 1.86 meters and the second length is about 5.5 meters. In some embodiments, the first length is about 1.26 meters and the second length is about 5.5 meters. In some embodiments, in addition to the first length of first segment 610 and the second length of second segment 611, the hybrid fiber provided by the present invention includes an additional non-pumped length of the second segment 611 (see, e.g., table 1202 of FIG. 12B). In some such embodiments, the additional non-pumped length of second segment 611 is about 0.5 meters, about 1.0 meters, about 1.5 meters, or about 2.0 meters. In some embodiments, more than two different types of fibers are used, e.g. second segment 611 becomes first segment 610 for another section of fiber amplifier, with a new second segment 611 of different fiber type.

In some embodiments, the configuration of hybrid fiber 601 (e.g., in some embodiments, the combination of core diameters and segment lengths of hybrid fiber 601) mitigates Stimulated Brillouin Scattering (SBS) such that the linewidth of the output signal beam produced by hybrid fiber 601 is in a range of about 5-20 gigahertz (GHz). In some such embodiments, hybrid fiber 601 is configured such that the linewidth of the output signal beam is about twenty gigahertz 20 GHz, about 19 GHz, about 18 GHz, about 17 GHz, about 16 GHz, about 15 GHz, about 14 GHz, about 13 GHz, about 12 GHz, about 11 GHz, about 10 GHz, about 9 GHz, about 8 GHz, about 7 GHz, about 6 GHz, or about 5 GHz.

In some embodiments a transition fiber or taper is used to transition the desired mode of the signal between segments 610 and 611 to minimize loss or conversion to higher order modes (see, e.g., FIG. 7). In some embodiments the core in segment 610 may use a confined doping profile and the core in segment 611 may use doping of the rare-earth element through the entire diameter of the core. In some embodiments the core in segment 610 may have a refractive index profile designed to produce a mode that matches that produced by the refractive index profile in the core of segment 611 with other properties tailored to reduce the heat loading in one or the other segments. In some embodiments the concentration of the rare-earth ion is higher in one segment to increase the relative absorption-per-unit-length in that segment.

In some embodiments pump light is introduced into segment 610 only and the connection between segments 610 and 611 minimizes pump losses to allow the pump light to be absorbed according to the geometry and absorption coefficient of the individual segments of fiber. In some embodiments pump light is introduced into segment 611 only. In some embodiments, pump light is introduced into both segments 610 and 611.

FIG. 7 is a schematic diagram of a hybrid fiber 701 that includes a tapered design to produce a large mode output fiber for mitigation of fiber nonlinearities while also being designed to manage thermal load in order to stay below the threshold for modal instabilities. In some embodiments, fiber 701 is a segmented fiber having a signal 799 that enters a first segment 710 that includes 10/140/200 triple-clad fiber, a second segment 711, and a third segment 712 that includes 30/420/600 triple-clad fiber. In some embodiments, fiber 701 includes a core 715, a first cladding layer 720, and a second cladding layer 721. In some embodiments, first cladding layer 720 has a 0.22 numerical aperture (NA) achieved through the use of F-doped silica. In some embodiments, second cladding layer 721 has a 0.46 NA and includes a low-index polymer (e.g., fluoroacrylate). In some embodiments, segment 711 forms an adiabatic up-taper between segment 710 and segment 712 that lowers the pump NA, trapping the pump light in the first cladding layer 720. In some embodiments, the higher core/clad ratio provided by segment 712 also increases the pump absorption fraction. In some embodiments, hybrid fiber 701 includes PM fiber. In other embodiments, hybrid fiber 701 includes non-PM fiber.

Figure 8:
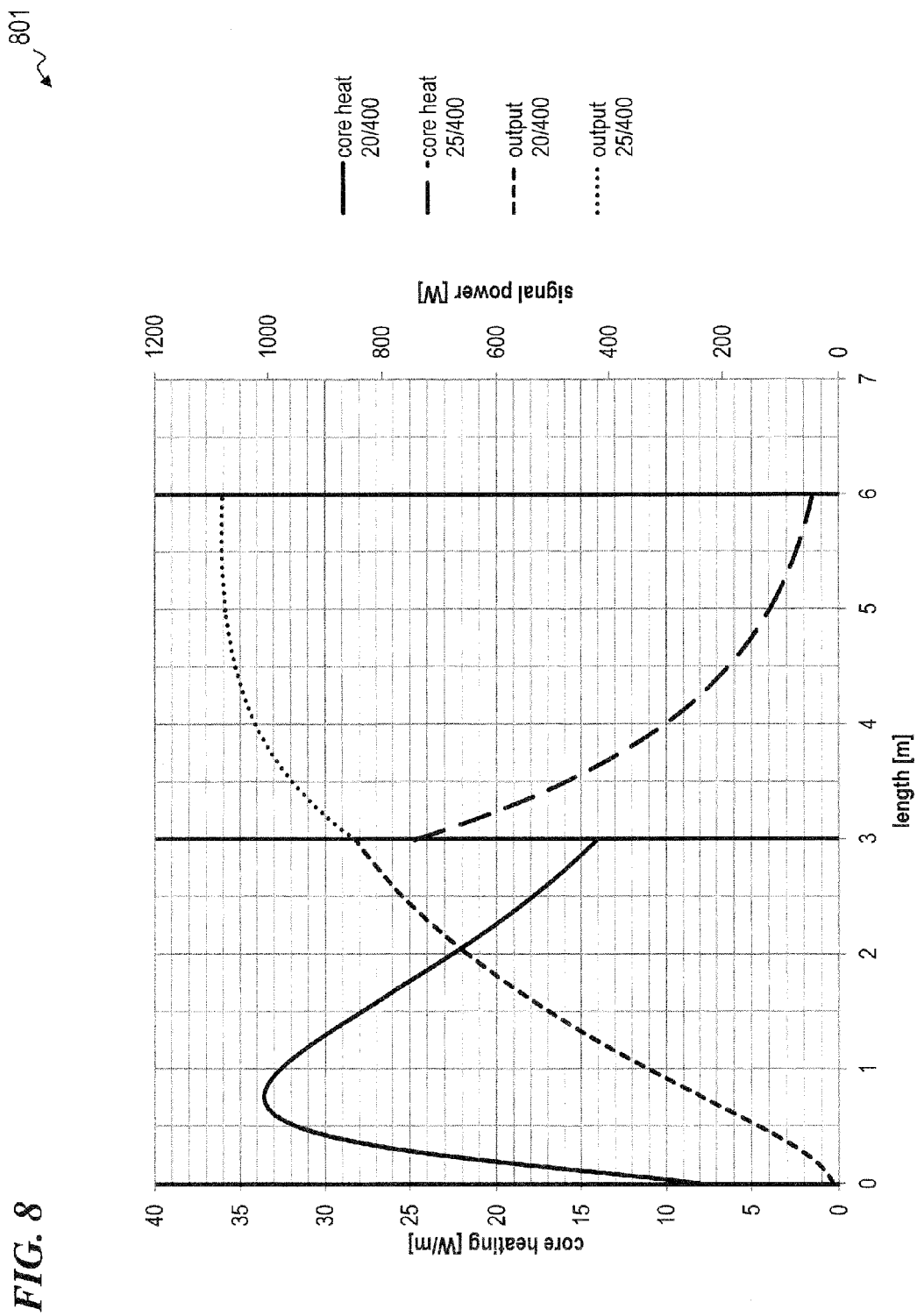
FIG. 8 is a graph 801 illustrating heat-load characteristics of hybrid fiber 601 with the pump light and signal co-propagating from first segment 610 to second segment 611.

FIG. 8 is a graph 801 illustrating heat-load characteristics of hybrid fiber 601 with the pump light and signal co-propagating from first segment 610 to second segment 611. The x-axis of graph 801 indicates the position along the length of hybrid fiber 601 in meters, the left-hand y-axis of graph 801 indicates the core heat load (W/m), and the right-hand y-axis indicates the signal power (W) produced by hybrid fiber 601. In some embodiments, as shown in graph 801, hybrid fiber 601 is configured such that each segment is three (3) meters long (in some such embodiments, as shown in graph 801, the first 3-meter segment has the 20/400 fiber and the next 3-meter segment has the 25/400 fiber).

Figure 9:
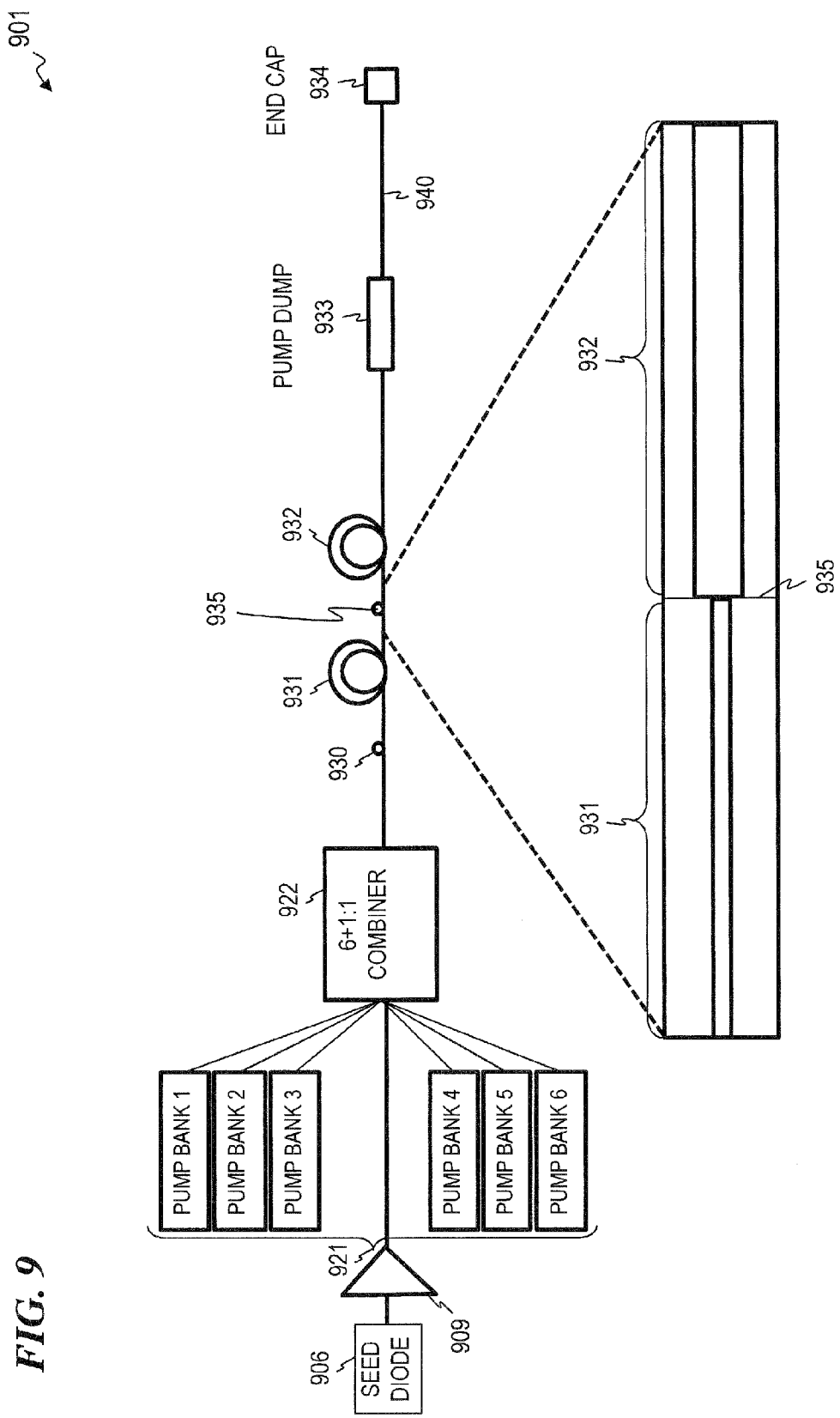
FIG. 9 is a schematic diagram of a 1-kilowatt hybrid-fiber-amplifier system 901.

FIG. 9 is a schematic diagram of a 1-kilowatt hybrid-fiber-amplifier system 901. In some embodiments, system 901 is designed to be operated in a range of about 10-12 GHz. In some embodiments, system 901 includes a seed diode 906, a two-stage booster amplifier 909, a plurality of pump banks 921, and a combiner 922. In some embodiments, combiner 922 is a 6+1:1 combiner. In some embodiments, the power of the signal outputted by amplifier 909 is about 10 watts (W). In some embodiments, the output from combiner 922 is operatively coupled to a first gain-fiber segment 931 that includes polarization-maintaining (PM) 20/400 ytterbium (Yb)-doped fiber. In some embodiments, gain-fiber segment 931 is operatively coupled to a second gain-fiber segment 932 via a hybrid splice 935. In some embodiments, gain-fiber segment 932 includes PM 25/400 Yb-doped fiber. In some embodiments, gain-fiber segment 931 and/or gain-fiber segment 932 include non-PM fibers. In some embodiments, the hybrid-fiber portion of system 901 formed by the splicing of gain-fiber segment 931 to gain-fiber segment 932 is substantially similar to hybrid fiber 601 of FIG. 6. In some embodiments, gain-fiber segment 932 is operatively coupled to pump dump 933. In some embodiments, the output of pump dump 933 is operatively coupled to an endcap 934 via fiber segment 940 (in some such embodiments, fiber segment 940 includes PM 25/400 Germanium (Ge)-doped fiber). In some embodiments, endcap 934 has a face having an angle in a range of about 6 to 8 degrees from a plane perpendicular to the axis of signal propagation (and about 0.5-2 millimeters in diameter).

In some embodiments, gain-fiber segment 931 is 3 meters long, gain-fiber segment 932 is 4.5 meters long, fiber segment 940 is 2.5 meters long, and system 901 has the following characteristics: SBS is less than or equal to 20 kW peak pulses, $M^2$ ratio less than or equal to 1.1, polarization extinction ratio (PER) is greater than or equal to 13 dB.

In some embodiments, system 901 provides advantages not available with conventional fiber-amplifier systems including the capability of gain-fiber segment 931 to use pump power which would otherwise create modal instabilities in the PM 25/400 gain-fiber segment 932 if a longer length were used alone, combined with the capability of the right-hand gain-fiber segment 932 to generate high power with increased SBS threshold compared to a PM 20/400 fiber.

FIG. 10A is a top-view schematic diagram of a spiral-mandrel assembly 1001 configured to provide optimized cooling for a hybrid gain fiber. In some embodiments, assembly 1001 includes a plate 1005 having a plurality of spiral channels 1010 in which fiber can be held (in some embodiments, plate 1005 is substantially similar to the optical fiber holder described in U.S. Pat. No. 7,809,236 to Muendel, which is incorporated herein by reference). In some embodiments, as shown in FIG. 10B, spiral channels 1010 are all in the same plane. In some embodiments, plate 1005 is configured to hold the hybrid-fiber portion of system 901 and the length of gain-fiber segment 931 held within channels 1010 of plate 1005 is long enough to prevent or minimize instabilities in gain-fiber segment 931 (e.g., in some embodiments, the length of gain-fiber segment 931 is about 3.5 meters). In some such embodiments, the splice between gain-fiber segment 931 and gain-fiber segment 932 is located within the portion of hybrid fiber contained in the spiral channels 1010 of plate 1005. In some embodiments, plate 1005 is configured to hold approximately 10 meters of fiber in a low-profile package. In some embodiments, assembly 1001 includes a star coupler 1020. In some embodiments, star coupler 1020 is operatively coupled to one signal fiber and six pump fibers (not shown) on the input (left) side of coupler 1020, and coupler 1020 is operatively coupled to gain-fiber segment 931 on the output (right) side of coupler 1020.

In some embodiments, a hybrid-fiber configuration is wrapped around two or more mandrels such as mandrel assembly 1001 of FIG. 10A. In some embodiments, for example, gain-fiber segment 931 of FIG. 9 is wrapped around a first mandrel assembly and gain-fiber segment 932 of FIG. 9 is wrapped around a second mandrel assembly. In some such embodiments, the splice between gain-fiber segment 931 and gain-fiber segment 932 is located between the two mandrel assemblies and the splice area is heat-sinked to manage thermal load due to splice losses.

FIG. 10B is a cross-sectional-view schematic diagram of spiral-mandrel assembly 1001.

Figure 11B:
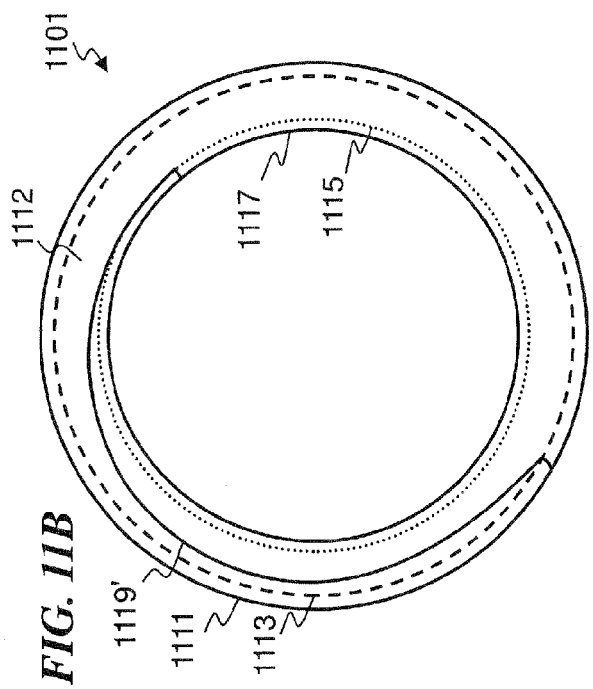
FIG. 11B is a top-end-view diagram of fiber-management-and-cooling apparatus 1101, according to some embodiments of the invention.
Figure 11A:
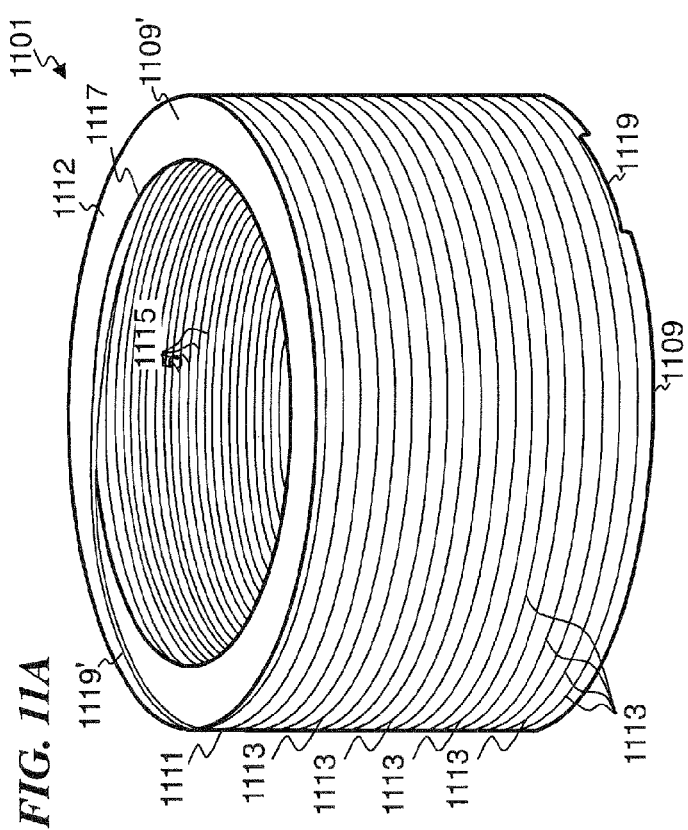
FIG. 11A is a perspective-view diagram of a fiber-management-and-cooling apparatus 1101, according to some embodiments of the invention.

FIG. 11A is a perspective-view diagram of a fiber-management-and-cooling apparatus 1101, according to some embodiments of the invention. In some embodiments, guiding-and-cooling apparatus 1101 includes a substantially cylindrical body (or cylinder) 1112 (e.g., in some embodiments, it is made of a thermally conductive metal such as silver, aluminum, or copper, or an alloy of two or more suitable elements) having an outer-facing surface 1111 and an inner-facing surface 117. In some embodiments, outer-facing surface 111 has an outer-facing-surface radius $R.sub.o$ and inner-facing surface 1117 has an inner-facing-surface radius. In some embodiments, the inner-facing surface 1117 includes a continuous inner groove 1115 that coils (this can alternatively be considered travels, wraps, spirals, or loops) around the inner-facing surface 1117 from the first end 1109 to the second end 1109' of the cylinder 1112. In some embodiments, the continuous inner groove 1115 spirals around the inner-facing surface 1117 from a first end to a second end in a right-hand-screw clockwise direction and in other embodiments, the continuous inner groove 1115 spirals in the opposite or counter-clockwise direction. In some embodiments, the distance between successive loops of continuous inner groove 1115 is substantially fixed. In some embodiments, the distance is selected such that the successive fiber loops are each in contact with their adjacent fiber-loop neighbors. In other embodiments, the distance is selected such that the successive fiber loops are spaced apart from their adjacent fiber-loop neighbors. In some embodiments, the outer-facing surface 1111 includes a continuous outer groove 1113 recessed into the outer-facing surface 1111 that coils around the outer-facing surface 1111 from the first end 109 of the cylinder 1112 to the second end 1109' of the cylinder 1112. In some embodiments, the continuous outer groove 1113 spirals around the outer-facing surface 1111 from the second end to the first end in a left-hand-screw clockwise direction (e.g., in the same clockwise direction as the inner spiral but in the opposite screw direction since the direction of successive loops is toward the first end) and in some other embodiments, the continuous groove 1113 spirals in the opposite or counter-clockwise direction. In some embodiments, the bottom of groove 1113 is rounded as shown in the present figures; however, in other embodiments, a V-shaped groove bottom or other shaped grooves are used.

FIG. 11B is a top-end-view diagram of fiber-management-and-cooling apparatus 1101, according to some embodiments of the invention.

Figure 12A:
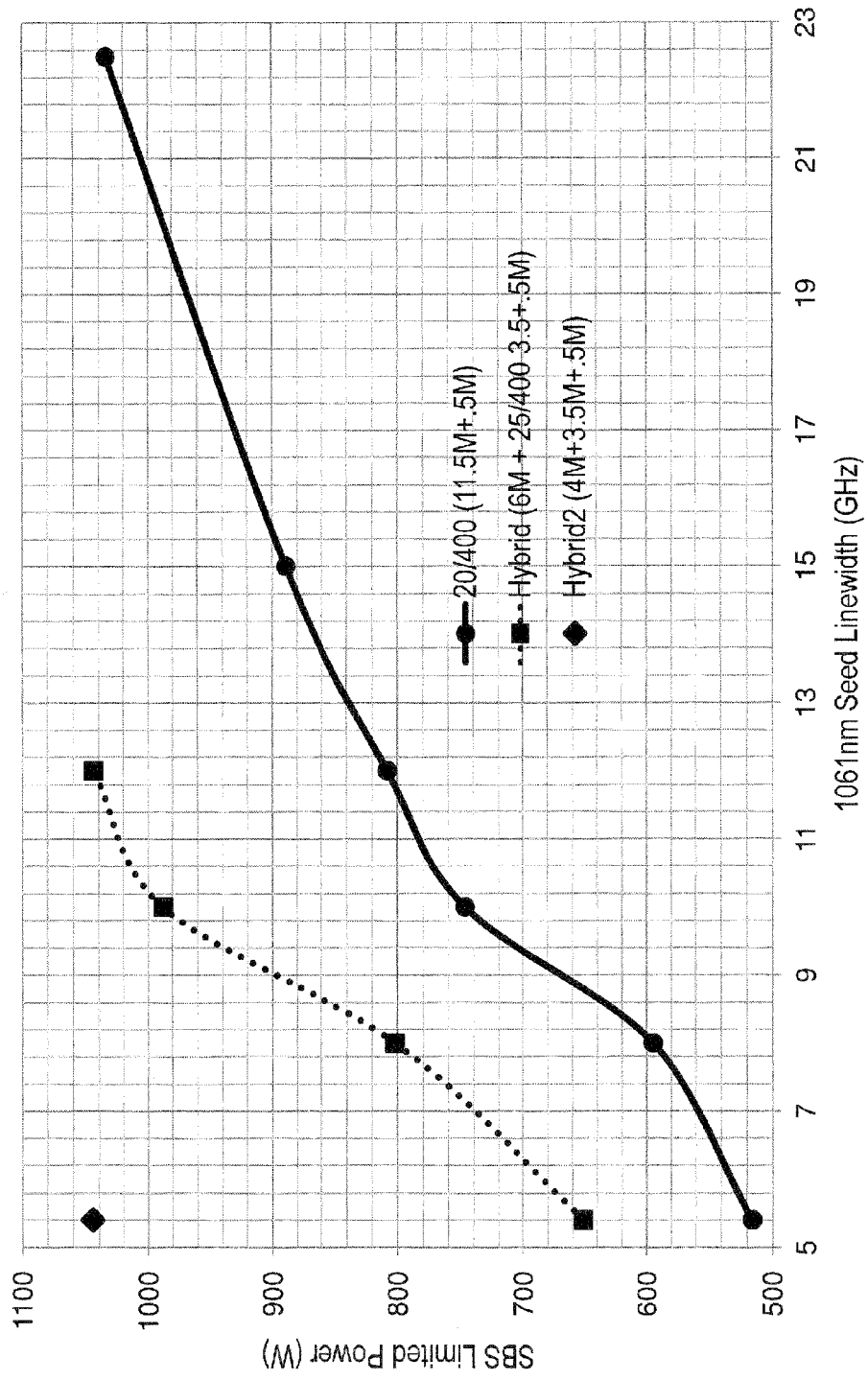
FIG. 12A is a graph 1201 of SBS-limited power (W) versus seed linewidth (GHz) for two hybrid-fiber configurations and a 20/400 fiber.

FIG. 12A is a graph 1201 of SBS-limited power (W) versus seed linewidth (GHz) for two hybrid-fiber configurations and a 20/400 fiber. In some embodiments, as shown in graph 1201, the hybrid-fiber configurations demonstrate superior SBS suppression compared to the 20/400 fiber due to a larger core size and a shorter absorption length. In some embodiments, the 20/400 fiber includes a 11.5-meter-long section that is pumped and a 0.5-meter-long section that is not pumped (e.g., in some embodiments, the 0.5-meter-long section is located in between pump dump 933 and end cap 934 of FIG. 9). In some embodiments, the first hybrid configuration includes a 6-meter-long section of 20/400 fiber spliced to a 3.5-meter-long 25/400 fiber that ends at a pump dump and a 0.5-meter-long section of 25/400 fiber located in between the pump dump and an end cap (e.g., in some embodiments, the 0.5-meter-long section is located in between pump dump 933 and end cap 934 of FIG. 9). In some embodiments, the second hybrid configuration (shown as Hybrid 2 on graph 1201) includes a 4-meter-long section of 20/400 fiber spliced to a 3.5-meter-long section of 25/400 fiber that ends at a pump dump and a 0.5-meter-long section of 25/400 fiber located in between the pump dump and an end cap (e.g., in some embodiments, the 0.5-meter-long section is located in between pump dump 933 and end cap 934 of FIG. 9).

FIG. 12B is a table 1202 of fiber-amplifier data for various hybrid-fiber configurations as a function of 20/400 fiber length. In some embodiments, the three fiber lengths shown for each hybrid configuration of table 1202 are the length of the 20/400 fiber, the length of the 25/400 fiber directly spliced to the 20/400 fiber, and the length of unpumped 25/400 fiber (e.g., the length of the 25/400 fiber located in between pump dump 933 and end cap 934 of FIG. 9). In some embodiments, it was determined that the length of the 20/400 fiber for both the Hybrid 4 configuration and the Hybrid 5 configuration was too short because modal instabilities were observed for these two configurations.

Figure 12C:
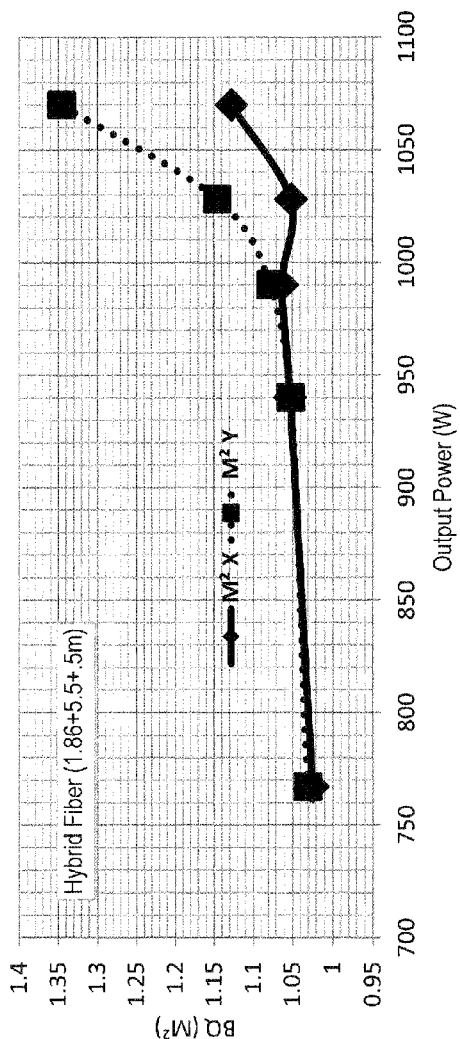
FIG. 12C is a graph 1203 showing beam quality ($M^2$ ratio) as a function of output power for the Hybrid 4 configuration of table 1202 in FIG. 12B.

FIG. 12C is a graph 1203 showing beam quality ($M^2$ ratio) as a function of output power for the Hybrid 4 configuration of table 1202 in FIG. 12B. In some embodiments the 1.86 meter length of 20/400 PM fiber used for graph 1203 resulted in the onset of MI above 1000 W.

Figure 12D:
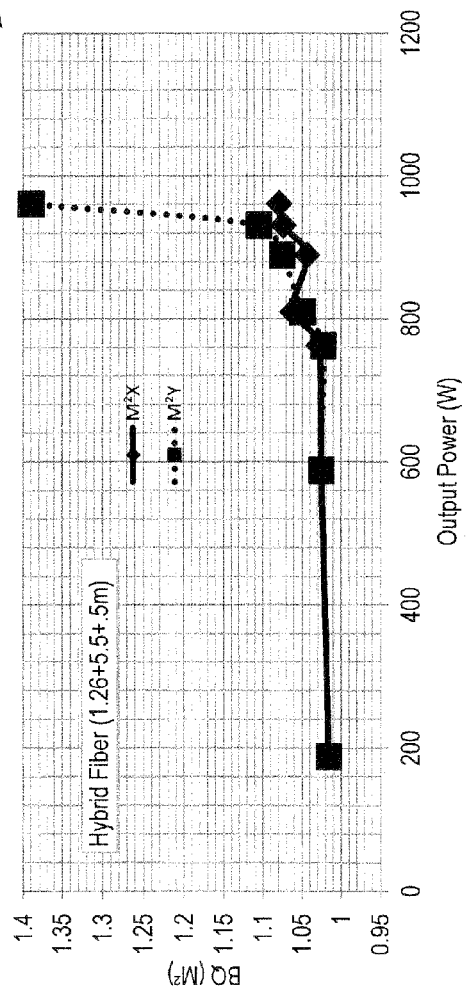
FIG. 12D is a graph 1204 showing beam quality ($M^2$ ratio) as a function of output power for the Hybrid 5 configuration of table 1202 in FIG. 12B.

FIG. 12D is a graph 1204 showing beam quality ($M^2$ ratio) as a function of output power for the Hybrid 5 configuration of table 1202 in FIG. 12B. In some embodiments the 1.26 m length of 20/400 PM fiber used for graph 1204 resulted in the onset of MI above 900 W.

Figure 12E:
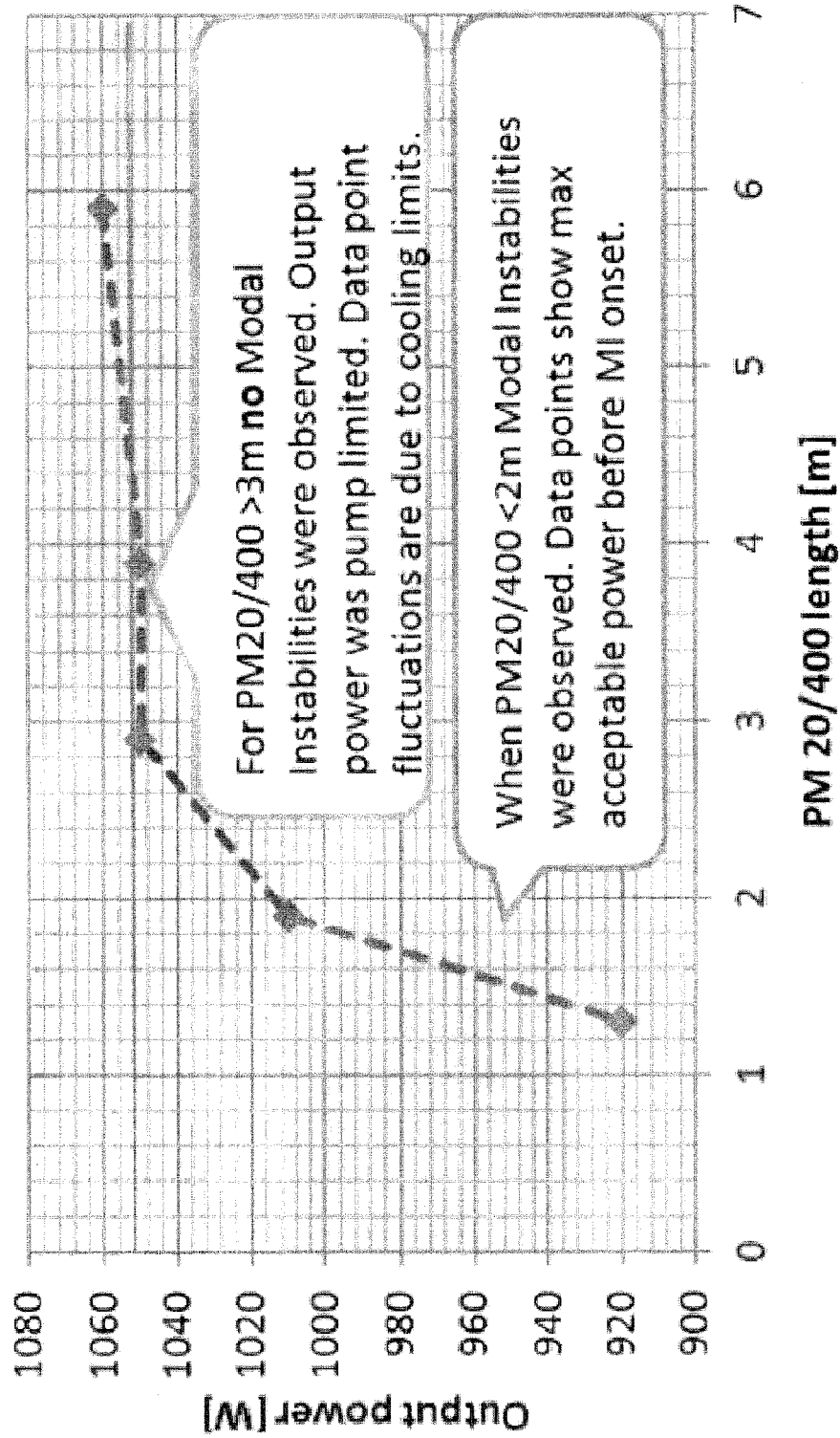
FIG. 12E is a graph 1205 of observed output power for different lengths of 20/400 PM fiber in a hybrid-amplifier configuration, according to some embodiments of the present invention.

FIG. 12E is a graph 1205 of observed output power for different lengths of 20/400 PM fiber in a hybrid-amplifier configuration, according to some embodiments of the present invention. In some embodiments a length of about 3 m of the 20/400 PM fiber section was sufficient to mitigate MI above the 1000 W level and the output power was then pump limited. In some embodiments, when the PM 20/400 fiber was less than 2 meter long, modal instabilities were observed.

Figure 13A:
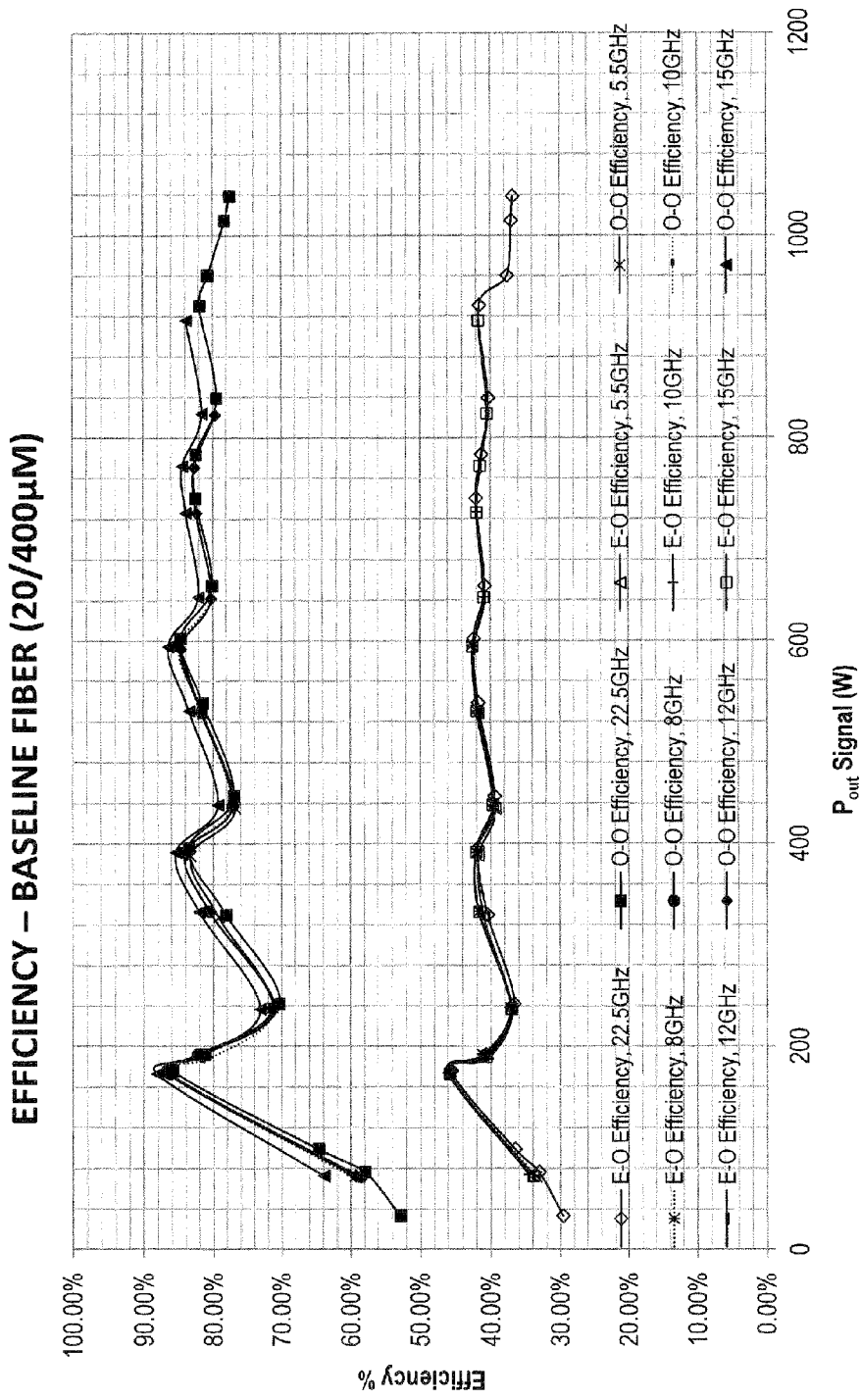
FIG. 13A is a graph 1301 of efficiency data for a baseline 20/400 fiber.

FIG. 13A is a graph 1301 of efficiency data for a baseline 20/400 fiber.

Figure 13B:
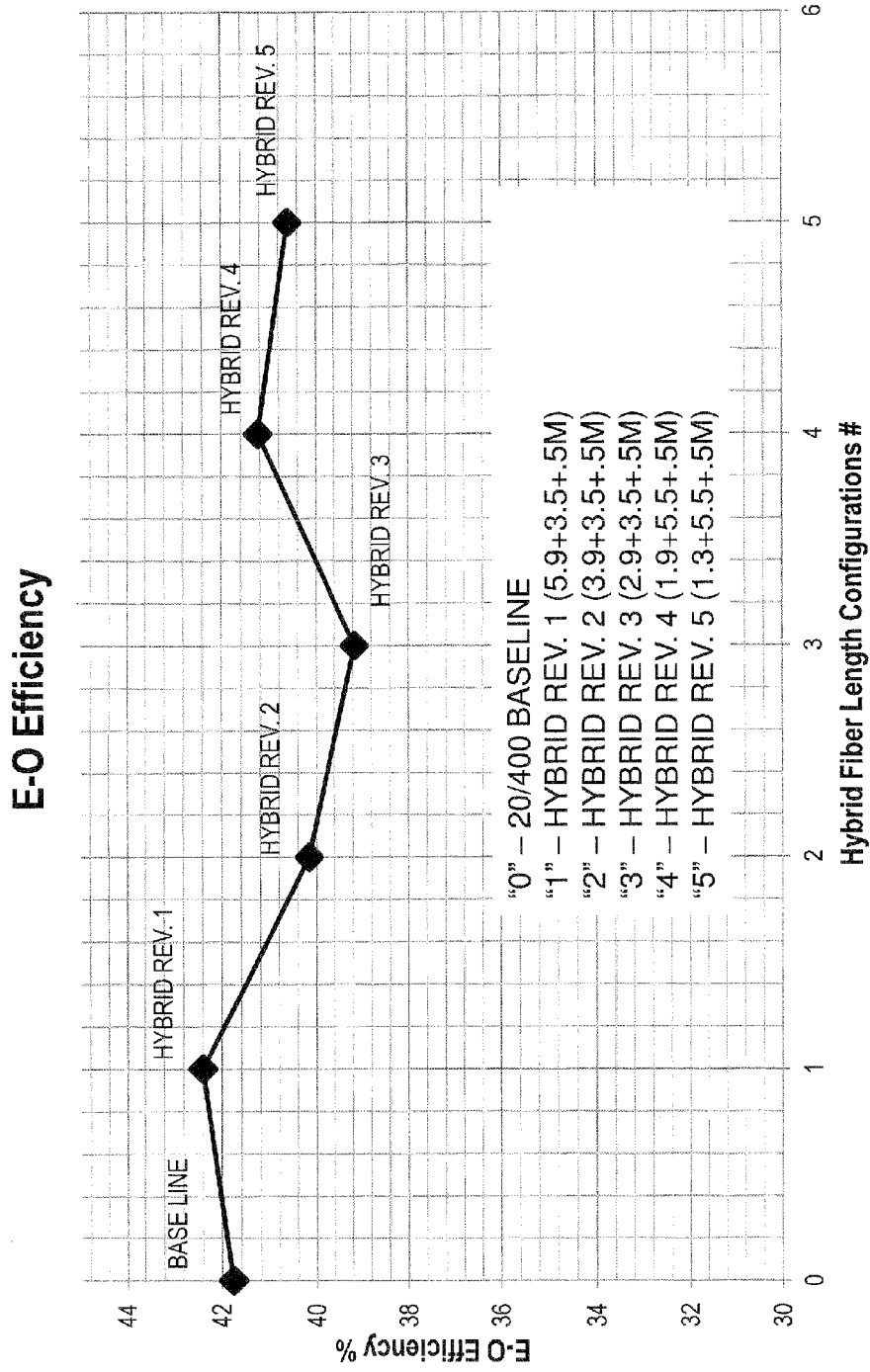
FIG. 13B is a graph 1302 illustrating power-amplifier electro-optic (E-O) efficiency for the hybrid-fiber configurations identified in table 1202 of FIG. 12B.

FIG. 13B is a graph 1302 illustrating power-amplifier electro-optic (E-O) efficiency for the hybrid-fiber configurations identified in table 1202 of FIG. 12B. As used in graph 1302, the efficiency values are based on an output power of about 500 watts (in some such embodiments, pump bank 3 of optical pumps 921 is operated at about 9 amps of current). In some embodiments, the E-O efficiency for the baseline fiber shown in graph 1302 is based on the efficiency data illustrated in graph 1301 of FIG. 13A. In some embodiments, as shown in graph 1302, the E-O efficiency remains high for the hybrid-fiber configurations.

Figure 14A:
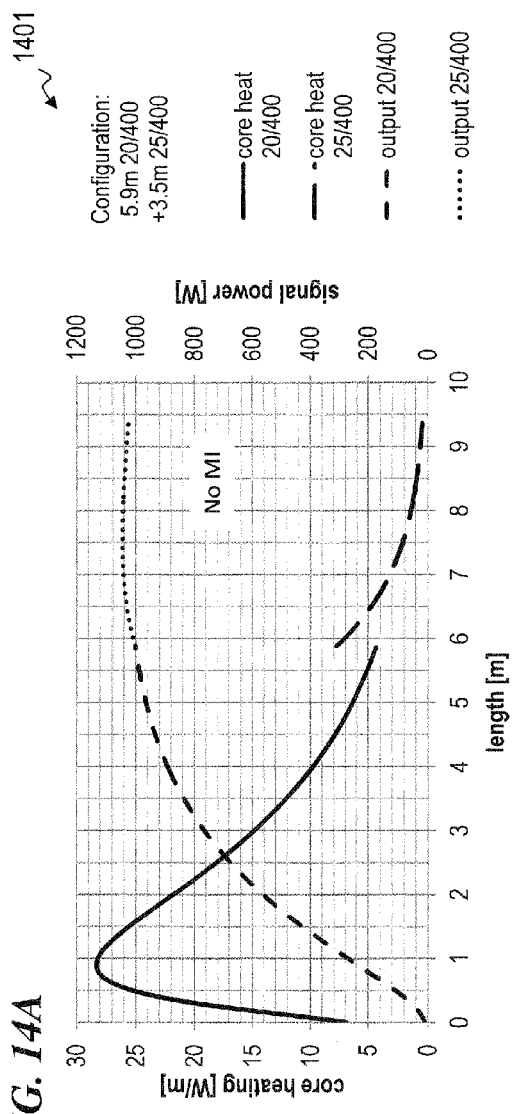
FIG. 14A is a graph 1401 illustrating heat-load characteristics of a hybrid fiber configuration that includes 5.9 meters of PM 20/400 fiber and 3.5 meters of PM 25/400 fiber.

FIG. 14A is a graph 1401 illustrating heat-load characteristics of a hybrid fiber configuration that includes 5.9 meters of PM 20/400 fiber and 3.5 meters of PM 25/400 fiber. In some embodiments, the configuration modeled for graph 1501 showed no modal instabilities. In some embodiments, the modeling for FIGS. 14A-14G was based on $7.74 \times 10^{25}$ ions/m$^3$ and pumping at 977 nm.

Figure 14B:
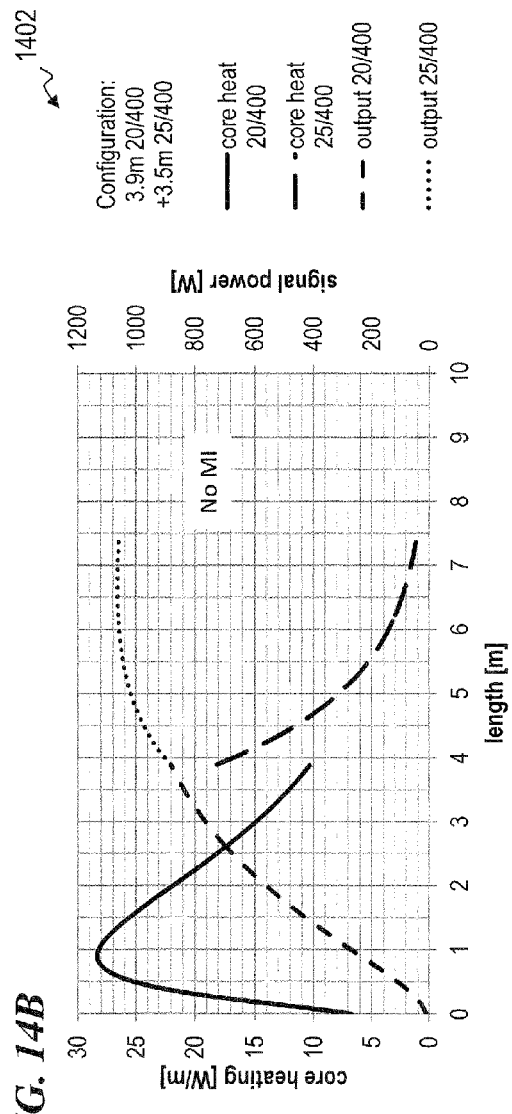
FIG. 14B is a graph 1402 illustrating heat-load characteristics of a hybrid fiber configuration that includes 3.9 meters of PM 20/400 fiber and 3.5 meters of PM 25/400 fiber.

FIG. 14B is a graph 1402 illustrating heat-load characteristics of a hybrid fiber configuration that includes 3.9 meters of PM 20/400 fiber and 3.5 meters of PM 25/400 fiber. In some embodiments, the configuration modeled for graph 1402 showed no modal instabilities up to the maximum output power available from the pump diodes.

Figure 14C:
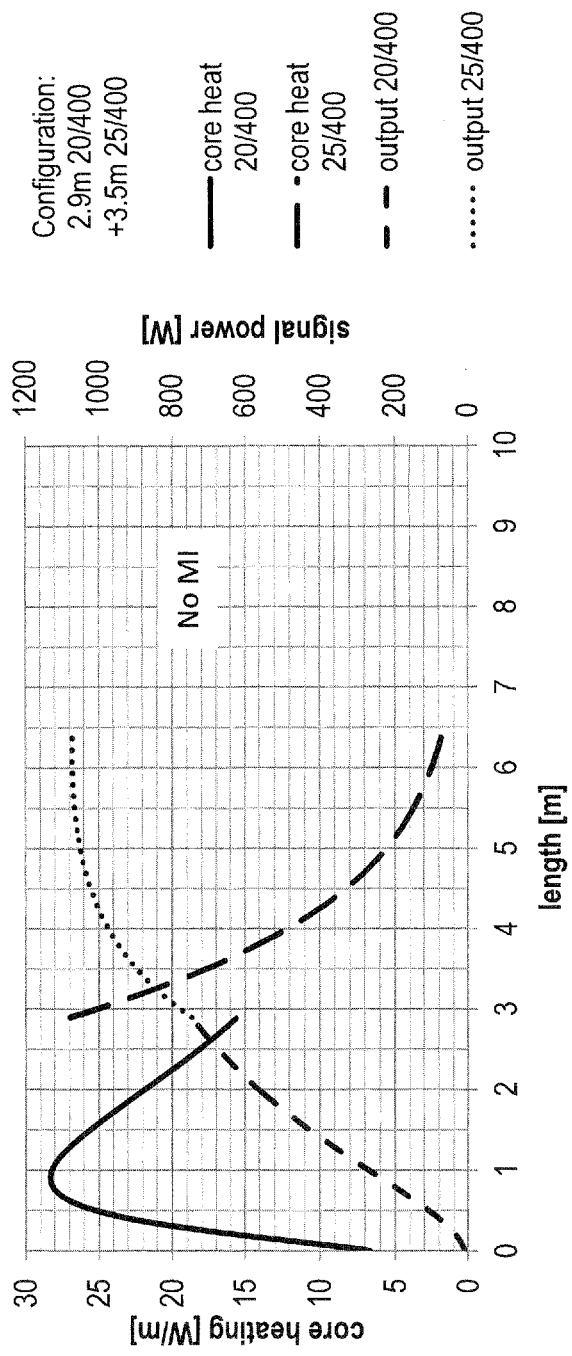
FIG. 14C is a graph 1403 illustrating heat-load characteristics of a hybrid fiber configuration that includes 2.9 meters of PM 20/400 fiber and 3.5 meters of PM 25/400 fiber.

FIG. 14C is a graph 1503 illustrating heat-load characteristics of a hybrid fiber configuration that includes 2.9 meters of PM 20/400 fiber and 3.5 meters of PM 25/400 fiber. In some embodiments, the configuration modeled for graph 1403 showed no modal instabilities up to the maximum output power available from the pump diodes.

In some embodiments it was observed that the use of the 20/400 PM fiber allowed a higher core heating per unit length in the 25/400 PM fiber than the core heating that resulted in modal instabilities for the 25/400 PM fiber amplifier without the hybrid configuration. In some embodiments the 20/400 PM fiber length still played an important role in the onset of modal instability. In some embodiments, based on the data from FIGS. 14A-14C, it was determined that core heat load in the hybrid-fiber configurations shows a threshold, but that thermal distribution along the fiber, in addition to core heating, is also relevant.

FIG. 14D is a graph 1404 illustrating heat-load characteristics of a hybrid-fiber configuration that includes 1.9 meters of PM 20/400 fiber and 3.5 meters of PM 25/400 fiber. In some embodiments, modal instabilities were observed at about 1030 W, and thus, in some embodiments, it was determined that core heating of 38 W/m leads to modal instabilities, similar to the experimental data shown in graph 1203.

FIG. 14E is a graph 1405 illustrating heat-load characteristics of a hybrid-fiber configuration that includes 1.3 meters of PM 20/400 fiber and 5.5 meters of PM 25/400 fiber. In some embodiments, modal instabilities were observed at about 930 W, and thus, in some embodiments, it was determined that core heating of 39.5 W/m leads to modal instabilities (a similar heat load to that of the hybrid-fiber configuration experimental data in graph 1204).

Figure 14F:
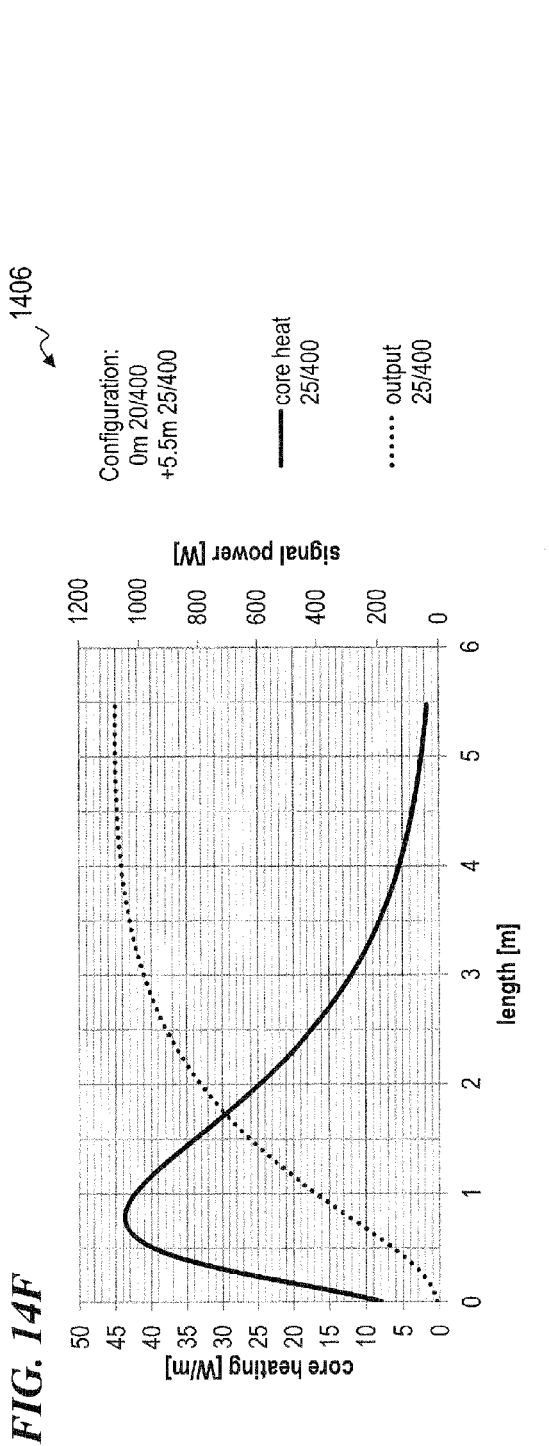
FIG. 14F is a graph 1406 illustrating heat-load characteristics of a hybrid-fiber configuration that includes 5.5 meters of PM 25/400 fiber (and no 20/400 fiber).

FIG. 14F is a graph 1406 illustrating heat-load characteristics of a hybrid-fiber configuration that includes 5.5 meters of PM 25/400 fiber (and no 20/400 fiber). In some embodiments, as shown in graph 1406, a 44 W/meter heat load was observed. In some embodiments, the pump power used for graph 1406 is sufficient to produce about 1 kW of output power.

Figure 14G:
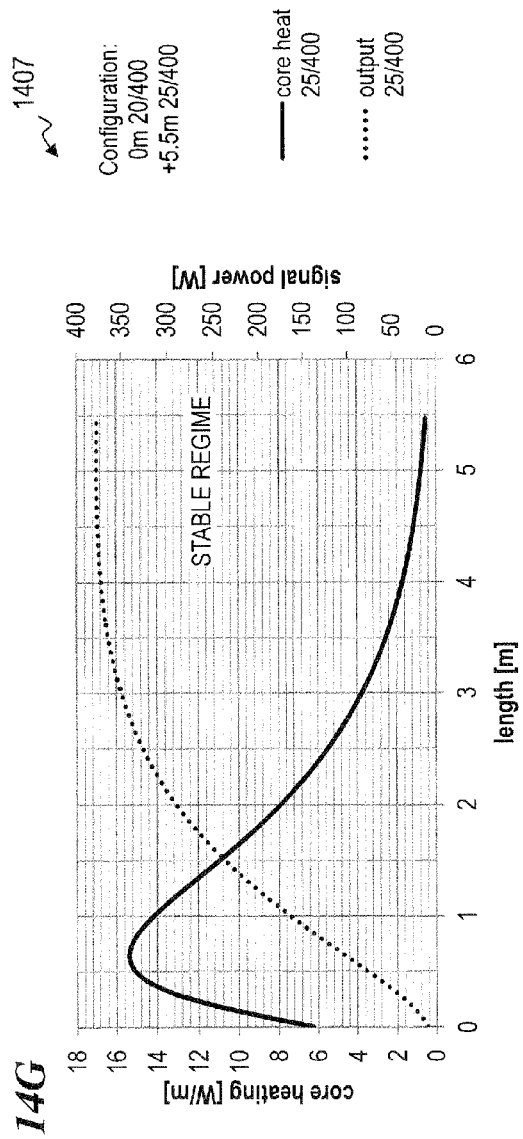
FIG. 14G is a graph 1407 illustrating heat-load characteristics of a hybrid-fiber configuration that includes 5.5 meters of PM 25/400 fiber (and no 20/400 fiber).

FIG. 14G is a graph 1407 illustrating heat-load characteristics of a hybrid-fiber configuration that includes 5.5 meters of PM 25/400 fiber (and no 20/400 fiber). In some embodiments, modal instabilities were observed at about 350 W, and thus, in some embodiments, it was determined that 15 W/m leads to modal instabilities. In some embodiments, based on the data from FIGS. 14A-14C, it was determined that core heat load in the hybrid-fiber configurations shows a threshold, but that thermal distribution along the fiber, in addition to core heating, is also relevant. In some embodiments, the pump power used for graph 1407 is sufficient to produce about 380 W of output power.

Summary of Hybrid-Fiber Results

In some embodiments, lengths of 2.9 meters or 3.9 meters for the 20/400 fiber of a hybrid-fiber configuration were needed before the 25/400 fiber spliced to the 20/400 fiber suppressed the modal instabilities beyond 1 kW. In other embodiments, lengths of 1.9 meters or 1.3 meters for the 20/400 fiber in a hybrid-fiber configuration showed progressively lower power levels for modal instability onset.

FIG. 15A is a graph 1501 showing the signal linewidth associated with one of the hybrid-fiber embodiments of the present invention as measured by a Scanning Fabry Perot spectrometer. In some embodiments, the characteristics corresponding to graph 1501 include output power of 1050 W, a 5.5 GHz signal linewidth, an $M^2$ ratio of 1.04, a PER of 14.6 dB, and no delivery fiber.

FIG. 15B is a graph 1502 of an 8-hour life test of a hybrid-fiber amplifier system according to some embodiments of the present invention. In some embodiments, graph 1502 shows the corrected output power ($P_{out}$) in watts versus time in minutes (min). In some embodiments, the hybrid-fiber configuration tested in graph 1502 includes a 4-meter-long section of pumped 20/400 fiber spliced to a 3.5-meter-long section of pumped 25/400 fiber and a 0.5-meter-long section of unpumped 25/400 fiber. In some embodiments, the signal linewidth is about 5.5 GHz. In some embodiments, the average PER was determined to be 14.5 dB with a standard deviation of 3.5 dB. In some embodiments, the power fluctuation of graph 1502 was due to cooling limitations of the tested configuration.

Figure 16:
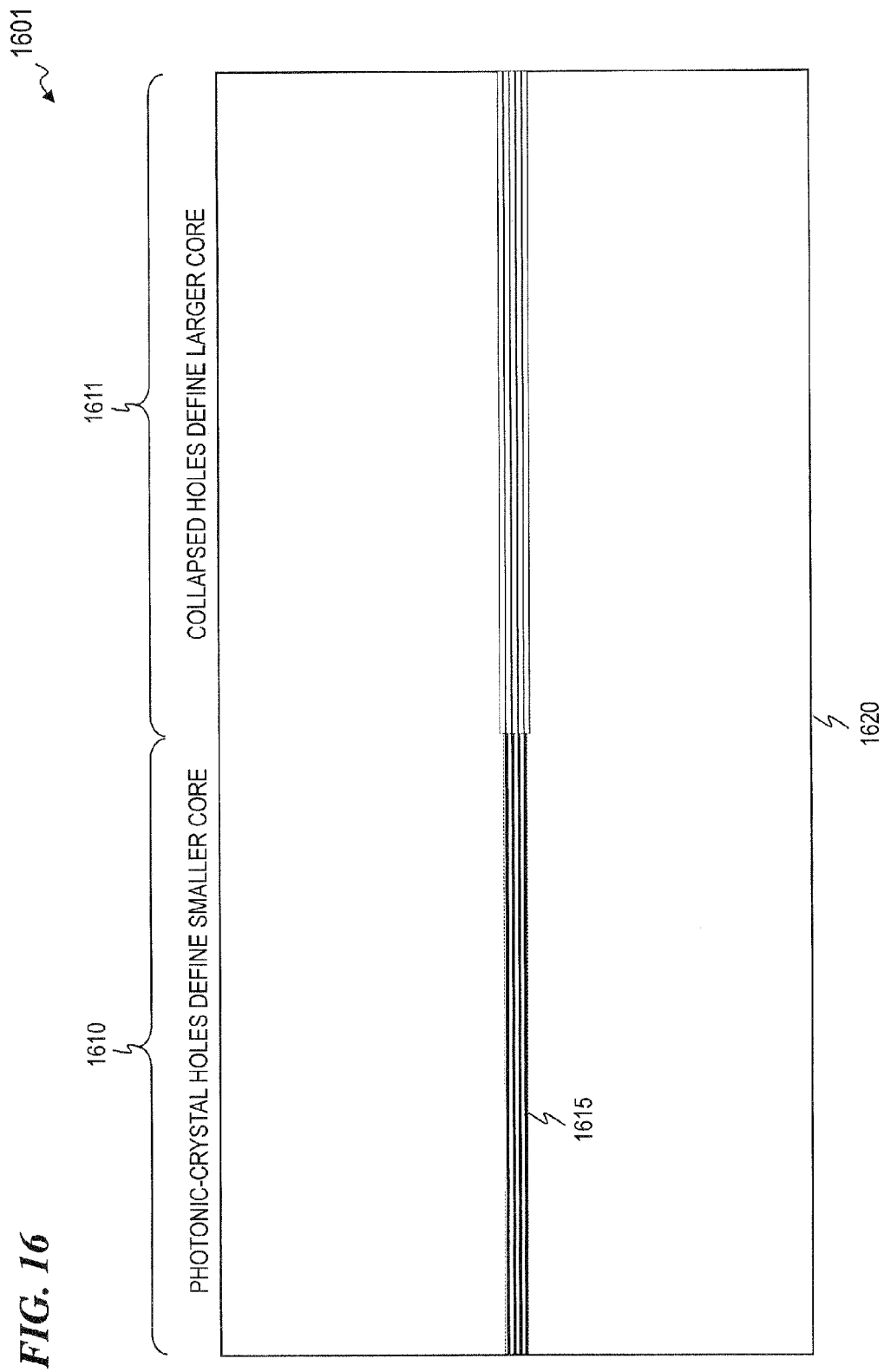
FIG. 16 is a schematic diagram of a hybrid-fiber configuration 1601 using longitudinal control of core or cladding properties through the collapse or post processing of air holes in the structure, such as those used in photonic-crystal fibers.

FIG. 16 is a schematic diagram of a hybrid-fiber configuration 1601 using longitudinal control of core or cladding properties through the collapse or post processing of air holes in the structure, such as those used in photonic-crystal fibers. In some embodiments, configuration 1601 includes a first segment 1610 and a second segment 1611. In some embodiments, the core 1615 and cladding 1620 of at least one of the fiber segments in configuration 1601 are conventional, except the cladding 1620 has an air-cladding design of a photonic-crystal rod (PCR) that is post-processed, e.g., tapers, air-cladding, and/or post-processing to collapse holes over a region of the fiber (e.g., in some such embodiments, the cladding 1620 in first segment 1610 includes photonic-crystal holes that define a smaller effective core and the cladding 1620 in second segment 1611 includes collapsed holes that define a larger effective core). In some embodiments, configuration 1601 uses an air-cladding design such as described in U.S. Pat. No. 7,391,561, which is incorporated herein by reference.

Figure 17B:
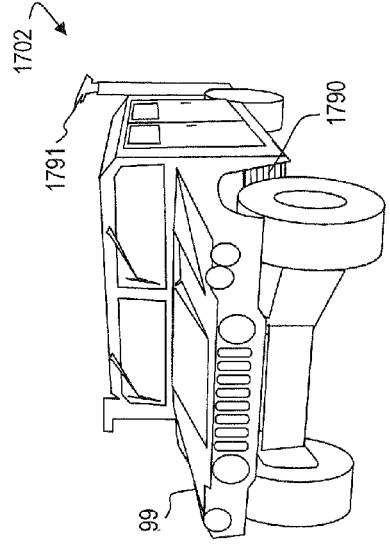
FIG. 17B is a perspective view of a mobile land-vehicle-based defensive system 1702 that uses a high-energy defensive device 1791 that includes a hybrid-fiber configuration, according to one embodiment of the present invention.
Figure 17A:
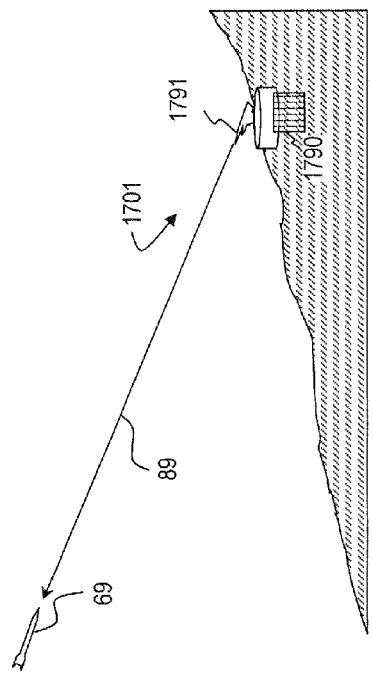
FIG. 17A is a perspective view of a land-based defensive system 1701 that uses a high-energy defensive point-able SBC device 1791 that includes a hybrid-fiber configuration, according to one embodiment of the present invention.

FIG. 17A is a perspective view of a land-based defensive system 1701 that uses a high-energy defensive point-able SBC device 1791 that includes a hybrid-fiber configuration, according to one embodiment of the present invention. In some embodiments, a laser system 1790 having a plurality of high-power lasers (e.g., in some embodiments, optically pumped rare-earth-doped fiber lasers, as are described in some of the various patents incorporated herein by reference) provides a plurality of very high-power laser beams (e.g., in some embodiments, 10 kilowatt or more each), each having a different wavelength, that are combined using SBC into a single extra high-power output beam. In some embodiments, the single extra high-power output beam is used as a directed-energy beam to protect against incoming missiles 69 or aircraft. In some embodiments, a portion of the single extra high-power output beam, using one or more laser modules, is used as a communications beam to communicate with aircraft, or seacraft, submarines or other vehicles. In some embodiments a portion of the high-power output beam is provided by one or more laser modules that can be configured for sensing applications such as active imaging or LIDAR. In some embodiments, laser system 1790 and SBC device 1791 are housed in a terrestrial building.

FIG. 17B is a perspective view of a mobile land-vehicle-based defensive system 1702 that uses a high-energy defensive device 1791 that includes a hybrid-fiber configuration, according to one embodiment of the present invention. In some embodiments, the single extra high-power output beam is used as a directed-energy beam to protect against incoming missiles or aircraft, or ground-based tanks or other vehicles. In some embodiments, a portion of the single extra high-power output beam, using one or more laser modules, is used as a communications beam to communicate with aircraft, or seacraft, submarines or other vehicles. In some embodiments a portion of the high-power output beam is provided by one or more laser modules that can be configured for sensing applications such as active imaging or LIDAR. In some embodiments, laser system 1790 and SBC device 1791 are housed in a mobile vehicle 99 such as a humvee or tank.

Figure 17C:
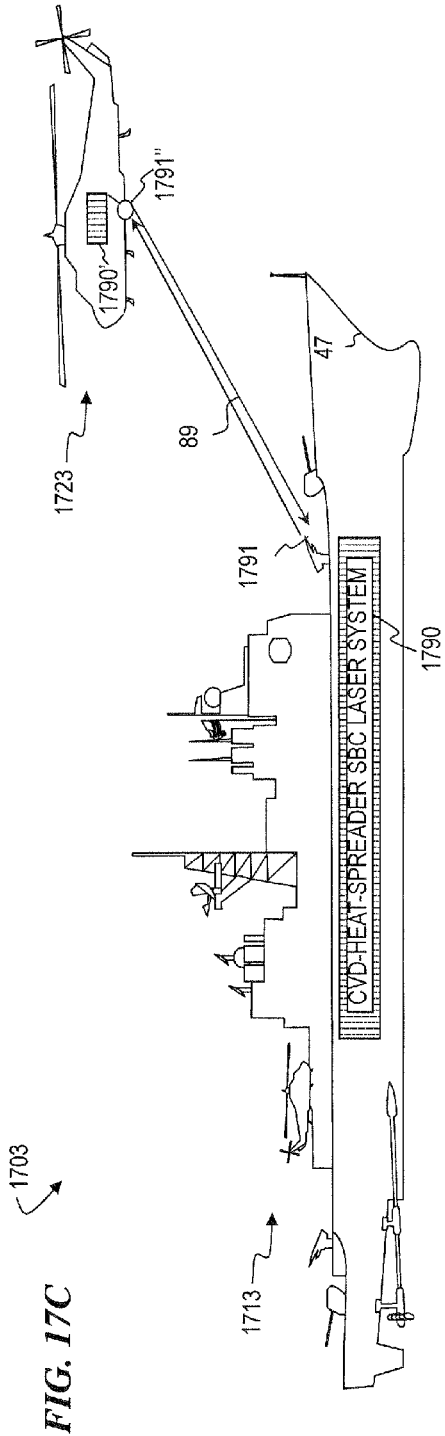
FIG. 17C is a perspective view of a mobile sea- and/or aircraft-vehicle-based defensive system 1703 that uses high-energy defensive device 1791 and/or 1791' that each include hybrid-fiber configurations, according to one embodiment of the present invention.

FIG. 17C is a perspective view of a mobile sea- and/or aircraft-vehicle-based defensive system 1703 that uses high-energy defensive device 1791 and/or 1791' that each include hybrid-fiber configurations, according to one embodiment of the present invention. In some embodiments, the single extra high-power output beam is used as a directed-energy beam to protect against incoming missiles or aircraft, or seacraft, submarines or other vehicles. In some embodiments, a portion of the single extra high-power output beam, using one or more laser modules, is used as a communications beam to communicate with aircraft, or seacraft, submarines or other vehicles. In some embodiments a portion of the high-power output beam is provided by one or more laser modules that can be configured for sensing applications such as active imaging or LIDAR. In some embodiments, laser system 1790 and SBC device 1791 are housed in a ship 1713 such as a destroyer, aircraft carrier, or frigate, or in an aircraft 1723 such as a fighter jet or helicopter.

In some embodiments, in addition to SBC defense-based systems, the hybrid-fiber configurations of the present invention are used with systems such as coherent LIDAR and frequency conversion. For example, in some embodiments, the hybrid-fiber configurations described herein are used with the laser system of U.S. Pat. No. 8,441,718, which is incorporated herein by reference.

In some embodiments, the present invention provides an apparatus that includes an optical-fiber amplifier having a plurality of optically coupled gain-fiber segments including a first gain-fiber segment and a second gain-fiber segment, wherein pump light is guided into the optical-fiber amplifier, wherein the first gain-fiber segment has a first core that has a first core diameter, wherein the first core is surrounded by a first cladding layer having a first outer diameter, wherein the first gain-fiber segment has a first end, a second end, and a first length, wherein signal light of a signal-light wavelength propagates in the first core, wherein the first gain-fiber segment has a first thermal load due, at least in part, to absorption of the pump light over the first length, wherein the second gain-fiber segment has a second core that has a second core diameter, wherein the second core diameter is larger than the first core diameter, wherein the second core is surrounded by a second cladding layer having a second outer diameter, wherein the second gain-fiber segment has a first end, a second end, and a second length, wherein the first end of the second gain-fiber segment is connected to the second end of the first gain-fiber segment, wherein a first amplified version of the signal light is coupled into the second core from the first core in a first direction, wherein the second gain-fiber segment has a second thermal load due, at least in part, to absorption of the pump light over the second length, wherein a second amplified version of the signal light is coupled out of the second core as an output signal beam, and wherein the first and second lengths are configured such that the second thermal load stays below a value at which a modal-instability occurs.

In some embodiments of the apparatus, the first length is in a range of about 1 to 10 meters and the second length is in a range of about 1 to 10 meters. In some embodiments, the first and/or second length is about 1 meter, about 1.5 meters, about 2 meters, about 2.5 meters, about 3 meters, about 3.5 meters, about 4 meters, about 4.5 meters, about 5 meters, about 5.5 meters, about 6 meters, about 6.5 meters, about 7 meters, about 7.5 meters, about 8 meters, about 8.5 meters, about 9 meters, about 9.5 meters, about 10 meters, or, in other embodiments, the first length is any one of the above values and the second length is any one of the above values.

In some embodiments of the apparatus, the optical-fiber amplifier is configured to produce the output signal beam with at least one kilowatt (1 kW) of power. In some embodiments, e optical-fiber amplifier is configured to produce the output signal beam with any other suitable power. In some embodiments, the optical-fiber amplifier is configured to mitigate Stimulated Brillouin Scattering (SBS) such that the linewidth of the output signal beam is less than twenty gigahertz (20 GHz). In some such embodiments, the optical-fiber amplifier is configured such that the linewidth of the output signal beam is about twenty gigahertz 20 GHz, about 19 GHz, about 18 GHz, about 17 GHz, about 16 GHz, about 15 GHz, about 14 GHz, about 13 GHz, about 12 GHz, about 11 GHz, about 10 GHz, about 9 GHz, about 8 GHz, about 7 GHz, about 6 GHz, or about 5 GHz.

In some embodiments of the apparatus, the second gain-fiber segment is spliced to the first gain-fiber segment. In some embodiments, the second gain-fiber segment is fused to the first gain-fiber segment. In some embodiments, the optical-fiber amplifier is drawn at different speeds to form the second core diameter to be larger than the first core diameter. In some embodiments, the second gain-fiber segment is connected to the first gain-fiber segment via a first tapered segment, and wherein the first outer diameter of the first cladding layer is smaller than the second outer diameter of the second cladding layer.

In some embodiments of the apparatus, the first core diameter is a first effective core diameter, wherein the second core diameter is a second effective core diameter, wherein the first gain-fiber segment includes photonic-crystal holes configured to define the first effective core diameter, and wherein the second gain-fiber segment includes at least partially collapsed photonic-crystal holes configured to define the second effective core diameter. In some embodiments, the first outer diameter of the first cladding layer is equal to the second outer diameter of the second cladding layer. In some embodiments, the first core diameter is about 5 to 30 microns and the second core diameter is larger than the first core diameter with the cladding diameters nominally identical.

In some embodiments, the apparatus further includes a plurality of optical pumps operatively coupled to the optical-fiber amplifier and configured to provide the pump light guided into the optical-fiber amplifier, wherein the pump light has a wavelength that is longer than a peak absorption wavelength of the optical-fiber amplifier. In some embodiments, the apparatus further includes a plurality of optical pumps operatively coupled to inject the pump light in the first direction into the second cladding layer of the second gain-fiber segment such that the pump light co-propagates through the second segment in the first direction of the signal light. In some embodiments, the apparatus further includes a plurality of optical pumps operatively coupled to inject the pump light in a second direction, opposite the first direction, into the second cladding layer of the second gain-fiber segment such that the pump light counter-propagates through the second segment in the second direction that is opposite the first direction of the signal light. In some embodiments, the apparatus further includes a plurality of optical pumps operatively coupled to inject the pump light into the optical-fiber amplifier at a plurality of locations along a length of the optical-fiber amplifier. In some embodiments, the apparatus further includes a plurality of optical pumps operatively coupled to inject the pump light into the optical-fiber amplifier, wherein the first end of the first gain-fiber segment includes a high-reflectivity surface and the second end of the second gain-fiber segment includes a low-reflectivity surface, and wherein the optical-fiber amplifier is configured to reflect the signal light between the high-reflectivity surface at the first end of the first gain-fiber segment and the low-reflectivity surface at the second end of the second gain-fiber segment in order to provide lasing of the signal light.

In some embodiments of the apparatus, the first gain-fiber segment has a first pump-light-absorption value per unit length, wherein the second gain-fiber segment has a second pump-light-absorption value per unit length, and wherein the second pump-light-absorption value is greater than the first pump-light-absorption value.

In some embodiments of the apparatus, the first core diameter is twenty (20) microns, wherein the second core diameter is twenty-five (25) microns, and wherein a first outer diameter of the first cladding layer of the first gain-fiber segment and a second outer diameter of the second cladding layer of the second gain-fiber segment are both four-hundred (400) microns. In some embodiments, the first gain-fiber segment and the second gain-fiber segment are both polarization-maintaining fibers.

In some embodiments, the apparatus further includes a spiral-mandrel assembly configured to cool the optical-fiber amplifier, wherein at least a portion of the first gain-fiber segment and at least a portion of the second gain-fiber segment are configured to wrap around the spiral-mandrel assembly in a low-profile spiral-fiber configuration such that the at least portion of the first gain-fiber segment and the at least portion of the second gain-fiber segment both lie on a single plane. In some embodiments, the apparatus further includes a first spiral-mandrel assembly, wherein at least a portion of the first gain-fiber segment is wrapped around the first spiral-mandrel assembly in a first low-profile spiral-fiber configuration such that the at least portion of the first gain-fiber segment lies on a first single plane; and a second spiral-mandrel assembly, wherein at least a portion of the second gain-fiber segment is wrapped around the second spiral-mandrel assembly in a second low-profile spiral-fiber configuration such that the at least portion of the second gain-fiber segment lies on a second single plane. In some embodiments, the apparatus further includes a mandrel assembly configured to cool the optical-fiber amplifier, wherein at least a portion of the first gain-fiber segment and at least a portion of the second gain-fiber segment are configured to wrap around the mandrel assembly in a cylindrical-profile configuration.

In some embodiments, the apparatus further includes a seed source operatively coupled to the optical-fiber amplifier to provide the signal light propagating in the first core, wherein the seed source includes: a polarization-maintaining seed diode, wherein the seed diode is a distributed-feedback laser, a plurality of optical isolators, and a plurality of polarization-maintaining amplifiers; the apparatus further including a plurality of optical pumps operatively coupled to the optical-fiber amplifier and configured to provide the pump light guided into the optical-fiber amplifier; a beam combiner configured to combine the pump light from the plurality of optical pumps and guide the pump light into the optical-fiber amplifier; a pump dump configured to remove excess pump light from the optical-fiber amplifier; and an end cap.

In some embodiments, the present invention provides a method that includes constructing an optical-fiber amplifier having a plurality of optically coupled gain-fiber segments including a first gain-fiber segment and a second gain-fiber segment, wherein the constructing of the optical-fiber amplifier includes: forming the first gain-fiber segment to have a first core that has a first core diameter, wherein the first core is surrounded by a first cladding layer having a first outer diameter, wherein the first gain-fiber segment has a first end, a second end, and a first length, and forming the second gain-fiber segment to have a second core that has a second core diameter, wherein the second core surrounded by a second cladding layer having a second outer diameter, wherein the second core diameter is larger than the first core diameter, wherein the second gain-fiber segment has a first end, a second end, and a second length, wherein the first end of the second gain-fiber segment is connected to the second end of the first gain-fiber segment, wherein the method further includes guiding pump light into the optical-fiber amplifier, wherein the first gain-fiber segment has a first thermal load due, at least in part, to absorption of the pump light over the first length, wherein the second gain-fiber segment has a second thermal load due, at least in part, to absorption of the pump light over the second length; propagating signal light of a signal-light wavelength in the first core; coupling a first amplified version of the signal light into the second core from the first core in a first direction; coupling a second amplified version of the signal light out of the second core as an output signal beam; and configuring the first and second lengths such that the second thermal load stays below a value at which a modal-instability occurs.

In some embodiments of the method, the coupling of the second amplified version of the signal light includes producing the output signal beam with at least one kilowatt (1 kW) of power. In some embodiments, the coupling of the second amplified version of the signal light includes producing the output signal beam with a linewidth of less than twenty gigahertz (20 GHz).

In some embodiments, the method further includes splicing the second gain-fiber segment to the first gain-fiber segment. In some embodiments, the method further includes fusing the second gain-fiber segment to the first gain-fiber segment. In some embodiments of the method, the constructing of the optical-fiber amplifier further includes drawing the optical-fiber amplifier at different speeds to form the second core diameter to be larger than the first core diameter. In some embodiments of the method, the constructing of the optical-fiber amplifier further includes forming a first tapered segment, wherein the second gain-fiber segment is connected to the first gain-fiber segment via the first tapered segment, and wherein the first outer diameter of the first cladding layer is smaller than the second outer diameter of the second cladding layer.

In some embodiments of the method, the first core diameter is a first effective core diameter, wherein the second core diameter is a second effective core diameter, wherein the forming of the first gain-fiber segment includes forming photonic-crystal holes that define the first effective core diameter, and wherein the forming of the second gain-fiber segment includes forming at least partially collapsed photonic-crystal holes that define the second effective core diameter.

In some embodiments of the method, the forming of the first gain-fiber segment includes forming the first outer diameter of the first cladding layer to be equal to the second outer diameter of the second cladding layer.

In some embodiments, the method further includes providing a plurality of optical pumps operatively coupled to the optical-fiber amplifier, wherein the guiding of the pump light includes guiding the pump light from the plurality of optical pumps into the optical-fiber amplifier, wherein the pump light has a wavelength that is longer than a peak absorption wavelength of the optical-fiber amplifier. In some embodiments, the method further includes providing a plurality of optical pumps operatively coupled to the optical-fiber amplifier, wherein the guiding of the pump light includes injecting the pump light from the plurality of optical pumps in the first direction into the second cladding layer of the second gain-fiber segment such that the pump light co-propagates through the second segment in the first direction of the signal light. In some embodiments, the method further includes providing a plurality of optical pumps operatively coupled the optical-fiber amplifier, wherein the guiding of the pump light includes injecting the pump light from the plurality of optical pumps in a second direction, opposite the first direction, into the second cladding layer of the second gain-fiber segment such that the pump light counter-propagates through the second segment in the second direction that is opposite the first direction of the signal light. In some embodiments, the method further includes providing a plurality of optical pumps operatively coupled to the optical-fiber amplifier, wherein the guiding of the pump light includes injecting the pump light from the plurality of optical pumps into the optical-fiber amplifier at a plurality of locations along a length of the optical-fiber amplifier. In some embodiments, the method further includes providing a plurality of optical pumps operatively coupled to the optical-fiber amplifier, wherein the guiding of the pump light includes injecting the pump light from the plurality of optical pumps into the optical-fiber amplifier, wherein the first end of the first gain-fiber segment includes a high-reflectivity surface and the second end of the second gain-fiber segment includes a low-reflectivity surface; and reflecting the signal light between the high-reflectivity surface at the first end of the first gain-fiber segment and the low-reflectivity surface at the second end of the second gain-fiber segment in order to provide lasing of the signal light.

In some embodiments of the method, the first gain-fiber segment has a first pump-light-absorption value per unit length, wherein the second gain-fiber segment has a second pump-light-absorption value per unit length, and wherein the second pump-light-absorption value is greater than the first pump-light-absorption value.

In some embodiments of the method, the first core diameter is twenty (20) microns, wherein the second core diameter is twenty-five (25) microns, and wherein a first outer diameter of the first cladding layer of the first gain-fiber segment and a second outer diameter of the second cladding layer of the second gain-fiber segment are both four-hundred (400) microns. In some embodiments of the method, the first gain-fiber segment and the second gain-fiber segment are both polarization-maintaining fibers.

In some embodiments, the method further includes providing a spiral-mandrel assembly configured to cool the optical-fiber amplifier; and wrapping at least a portion of the first gain-fiber segment and at least a portion of the second gain-fiber segment around the spiral-mandrel assembly in a low-profile spiral-fiber configuration such that the at least portion of the first gain-fiber segment and the at least portion of the second gain-fiber segment both lie on a single plane. In some embodiments, the method further includes providing a first spiral-mandrel assembly; wrapping at least a portion of the first gain-fiber segment around the first spiral-mandrel assembly in a first low-profile spiral-fiber configuration such that the at least portion of the first gain-fiber segment lies on a first single plane; providing a second spiral-mandrel assembly; and wrapping at least a portion of the second gain-fiber segment around the second spiral-mandrel assembly in a second low-profile spiral-fiber configuration such that the at least portion of the second gain-fiber segment lies on a second single plane. In some embodiments, the method further includes providing a mandrel assembly configured to cool the optical-fiber amplifier; and wrapping at least a portion of the first gain-fiber segment and at least a portion of the second gain-fiber segment around the mandrel assembly in a cylindrical-profile configuration.

In some embodiments, the method further includes providing a seed source operatively coupled to the optical-fiber amplifier, wherein the propagating of the signal light in the first core includes injecting the signal light from the seed source into the optical-fiber amplifier, wherein the seed source includes: a polarization-maintaining seed diode, wherein the seed diode is a distributed-feedback laser, a plurality of optical isolators, and a plurality of polarization-maintaining amplifiers; wherein the method further includes providing a plurality of optical pumps operatively coupled to the optical-fiber amplifier and configured to provide the pump light; beam combining the pump light provided by the plurality of optical pumps to form a combined pump light and guiding the combined pump light into the optical-fiber amplifier; removing excess pump light from the optical-fiber amplifier; and providing an end cap optically coupled to the optical-fiber amplifier.

In some embodiments, the present invention provides an apparatus that includes an optical-fiber amplifier having a plurality of optically coupled gain-fiber segments including a first gain-fiber segment and a second gain-fiber segment; wherein the first gain-fiber segment has a first core that has a first core diameter, wherein the first core is surrounded by a first cladding layer having a first outer diameter, wherein the first gain-fiber segment has a first end, a second end, and a first length; wherein the second gain-fiber segment has a second core that has a second core diameter, wherein the second core surrounded by a second cladding layer having a second outer diameter, wherein the second core diameter is larger than the first core diameter, wherein the second gain-fiber segment has a first end, a second end, and a second length, wherein the first end of the second gain-fiber segment is connected to the second end of the first gain-fiber segment; means for guiding pump light into the optical-fiber amplifier, wherein the first gain-fiber segment has a first thermal load due, at least in part, to absorption of the pump light over the first length, wherein the second gain-fiber segment has a second thermal load due, at least in part, to absorption of the pump light over the second length; means for propagating signal light of a signal-light wavelength in the first core; means for coupling a first amplified version of the signal light into the second core from the first core in a first direction; means for coupling a second amplified version of the signal light out of the second core as an output signal beam; and means for configuring the first and second lengths such that the second thermal load stays below a value at which a modal-instability occurs.

It is specifically contemplated that the present invention includes embodiments having combinations and subcombinations of the various embodiments and features that are individually described herein, including the various embodiments described by patent applications and patents incorporated by reference herein (i.e., rather than listing every combinatorial of the elements, this specification includes descriptions of representative embodiments and contemplates embodiments that include some of the features from one embodiment combined with some of the features of another embodiment). Further, some embodiments include fewer than all the components described as part of any one of the embodiments described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
  an optical-fiber amplifier having a plurality of optically coupled gain-fiber segments including a first gain-fiber segment and a second gain-fiber segment,
  wherein pump light is guided into the optical-fiber amplifier,
  wherein the first gain-fiber segment has a first core that has a first core diameter,
  wherein the first core is surrounded by a first cladding layer having a first outer diameter,
  wherein the first gain-fiber segment has a first end, a second end, and a first length,
  wherein signal light of a signal-light wavelength propagates in the first core,
  wherein the first gain-fiber segment has a first thermal load due, at least in part, to absorption of the pump light over the first length,
  wherein the second gain-fiber segment has a second core that has a second core diameter,
  wherein the second core diameter is larger than the first core diameter,
  wherein the second core is surrounded by a second cladding layer having a second outer diameter,
  wherein the second gain-fiber segment has a first end, a second end, and a second length,
  wherein the first end of the second gain-fiber segment is connected to the second end of the first gain-fiber segment,
  wherein a first amplified version of the signal light is coupled into the second core from the first core in a first direction,
  wherein the second gain-fiber segment has a second thermal load due, at least in part, to absorption of the pump light over the second length,
  wherein a second amplified version of the signal light is coupled out of the second core as an output signal beam, and wherein the first and second lengths are configured such that the second thermal load stays below a value at which a modal-instability occurs.

2. The apparatus of claim 1, wherein the optical-fiber amplifier is configured to produce the output signal beam with at least one kilowatt (1 kW) of power.

3. The apparatus of claim 1, wherein the optical-fiber amplifier is configured to mitigate Stimulated Brillouin Scattering (SBS) such that the linewidth of the output signal beam is less than twenty gigahertz (20 GHz).

4. The apparatus of claim 1, wherein the second gain-fiber segment is spliced to the first gain-fiber segment.

5. The apparatus of claim 1, wherein the second gain-fiber segment is connected to the first gain-fiber segment via a first tapered segment, and wherein the first outer diameter of the first cladding layer is smaller than the second outer diameter of the second cladding layer.

6. The apparatus of claim 1, wherein the first core diameter is a first effective core diameter, wherein the second core diameter is a second effective core diameter, wherein the first gain-fiber segment includes photonic-crystal holes configured to define the first effective core diameter, and wherein the second gain-fiber segment includes at least partially collapsed photonic-crystal holes configured to define the second effective core diameter.

7. The apparatus of claim 1, further comprising a plurality of optical pumps operatively coupled to the optical-fiber amplifier and configured to provide the pump light guided into the optical-fiber amplifier, wherein the pump light has a wavelength that is longer than a peak absorption wavelength of the optical-fiber amplifier.

8. The apparatus of claim 1, further comprising a plurality of optical pumps operatively coupled to inject the pump light in the first direction into the second cladding layer of the second gain-fiber segment such that the pump light co-propagates through the second segment in the first direction of the signal light.

9. The apparatus of claim 1, wherein the first gain-fiber segment has a first pump-light-absorption value per unit length, wherein the second gain-fiber segment has a second pump-light-absorption value per unit length, and wherein the second pump-light-absorption value is greater than the first pump-light-absorption value.

10. The apparatus of claim 1, wherein the first core diameter is twenty (20) microns, wherein the second core diameter is twenty-five (25) microns, and wherein a first outer diameter of the first cladding layer of the first gain-fiber segment and a second outer diameter of the second cladding layer of the second gain-fiber segment are both four-hundred (400) microns.

11. A method comprising:
constructing an optical-fiber amplifier having a plurality of optically coupled gain-fiber segments including a first gain-fiber segment and a second gain-fiber segment, wherein the constructing of the optical-fiber amplifier includes:
forming the first gain-fiber segment to have a first core that has a first core diameter, wherein the first core is surrounded by a first cladding layer having a first outer diameter, wherein the first gain-fiber segment has a first end, a second end, and a first length, and
forming the second gain-fiber segment to have a second core that has a second core diameter, wherein the second core is surrounded by a second cladding layer having a second outer diameter, wherein the second core diameter is larger than the first core diameter, wherein the second gain-fiber segment has a first end, a second end, and a second length, wherein the first end of the second gain-fiber segment is connected to the second end of the first gain-fiber segment,
guiding pump light into the optical-fiber amplifier, wherein the first gain-fiber segment has a first thermal load due, at least in part, to absorption of the pump light over the first length, wherein the second gain-fiber segment has a second thermal load due, at least in part, to absorption of the pump light over the second length;
propagating signal light of a signal-light wavelength in the first core;
coupling a first amplified version of the signal light into the second core from the first core in a first direction;
coupling a second amplified version of the signal light out of the second core as an output signal beam; and
configuring the first and second lengths such that the second thermal load stays below a value at which a modal-instability occurs.

12. The method of claim 11, wherein the coupling of the second amplified version of the signal light includes producing the output signal beam with at least one kilowatt (1 kW) of power.

13. The method of claim 11, wherein the coupling of the second amplified version of the signal light includes producing the output signal beam with a linewidth of less than twenty gigahertz (20 GHz).

14. The method of claim 11, further comprising splicing the second gain-fiber segment to the first gain-fiber segment.

15. The method of claim 11, wherein the constructing of the optical-fiber amplifier further includes forming a first tapered segment, wherein the second gain-fiber segment is connected to the first gain-fiber segment via the first tapered segment, and wherein the first outer diameter of the first cladding layer is smaller than the second outer diameter of the second cladding layer.

16. The method of claim 11, wherein the first core diameter is a first effective core diameter, wherein the second core diameter is a second effective core diameter, wherein the forming of the first gain-fiber segment includes forming photonic-crystal holes that define the first effective core diameter, and wherein the forming of the second gain-fiber segment includes forming at least partially collapsed photonic-crystal holes that define the second effective core diameter.

17. The method of claim 11, further comprising providing a plurality of optical pumps operatively coupled to the optical-fiber amplifier, wherein the guiding of the pump light includes guiding the pump light from the plurality of optical pumps into the optical-fiber amplifier, wherein the pump light has a wavelength that is longer than a peak absorption wavelength of the optical-fiber amplifier.

18. The method of claim 11, further comprising:
providing a plurality of optical pumps operatively coupled to the optical-fiber amplifier, wherein the guiding of the pump light includes injecting the pump light from the plurality of optical pumps in the first direction into the second cladding layer of the second gain-fiber segment such that the pump light co-propagates through the second segment in the first direction of the signal light.

19. The method of claim 11, further comprising:
providing a plurality of optical pumps operatively coupled to the optical-fiber amplifier, wherein the guiding of the pump light includes injecting the pump light from the plurality of optical pumps into the optical-fiber amplifier, wherein the first end of the first gain-fiber segment includes a high-reflectivity surface and the second end of the second gain-fiber segment includes a low-reflectivity surface; and reflecting the signal light between the high-reflectivity surface at the first end of the first gain-fiber segment and the low-reflectivity surface at the second end of the second gain-fiber segment in order to provide lasing of the signal light.

20. An apparatus comprising:

an optical-fiber amplifier having a plurality of optically coupled gain-fiber segments including a first gain-fiber segment and a second gain-fiber segment;

wherein the first gain-fiber segment has a first core that has a first core diameter, wherein the first core is surrounded by a first cladding layer having a first outer diameter, wherein the first gain-fiber segment has a first end, a second end, and a first length;

wherein the second gain-fiber segment has a second core that has a second core diameter, wherein the second core surrounded by a second cladding layer having a second outer diameter, wherein the second core diameter is larger than the first core diameter, wherein the second gain-fiber segment has a first end, a second end, and a second length, wherein the first end of the second gain-fiber segment is connected to the second end of the first gain-fiber segment;

means for guiding pump light into the optical-fiber amplifier, wherein the first gain-fiber segment has a first thermal load due, at least in part, to absorption of the pump light over the first length, wherein the second gain-fiber segment has a second thermal load due, at least in part, to absorption of the pump light over the second length;

means for propagating signal light of a signal-light wavelength in the first core;

means for coupling a first amplified version of the signal light into the second core from the first core in a first direction;

means for coupling a second amplified version of the signal light out of the second core as an output signal beam; and means for configuring the first and second lengths such that the second thermal load stays below a value at which a modal-instability occurs.

* * * * *